(12) United States Patent
Philyaw et al.

(10) Patent No.: US 7,636,788 B2
(45) Date of Patent: *Dec. 22, 2009

(54) METHOD AND APPARATUS FOR MATCHING A USER'S USE PROFILE IN COMMERCE WITH A BROADCAST

(75) Inventors: Jeffry Jovan Philyaw, Dallas, TX (US); David Kent Mathews, Carrollton, TX (US)

(73) Assignee: RPX-LV Acquisition LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/872,524

(22) Filed: Oct. 15, 2007

(65) Prior Publication Data

US 2008/0040506 A1   Feb. 14, 2008

Related U.S. Application Data

(63) Continuation of application No. 09/382,372, filed on Aug. 24, 1999, now Pat. No. 7,284,066, which is a continuation-in-part of application No. 09/378,221, filed on Aug. 19, 1999, now Pat. No. 6,745,234, which is a continuation-in-part of application No. 09/151,471, filed on Sep. 11, 1998, now abandoned, and a continuation-in-part of application No. 09/151,530, filed on Sep. 11, 1998, now Pat. No. 6,098,106.

(51) Int. Cl.
 G06F 15/16 (2006.01)
 G06F 15/173 (2006.01)
(52) U.S. Cl. ........................ 709/238; 709/206; 709/245
(58) Field of Classification Search ................ 709/238, 709/206, 245, 246, 201; 705/14, 16, 23
See application file for complete search history.

(56) References Cited

U.S. PATENT DOCUMENTS 3,668,312 A   6/1972   Yamamoto et al.

(Continued)

FOREIGN PATENT DOCUMENTS

CA   2250450   4/1999

(Continued)

OTHER PUBLICATIONS

"Bar Code Method for Automating Catalog Orders," IBM Technical Disclosure Bulletin, No. 88A 61554, Sep. 1988, pp. 243-244.

(Continued)

*Primary Examiner*—Paul H Kang
(74) *Attorney, Agent, or Firm*—Howison & Arnott, L.L.P.

(57) ABSTRACT

A method for advertising over a network and broadcast media combination. A user's computer at a location on the network is operable to receive a signal from a broadcast generated by an advertiser, which signal has embedded therein unique coded information. The user's computer is connected to an advertiser's location in response to extracting a representation of the audio signal including at least the unique coded information. The advertiser's location is correlated to the unique coded information. The operation of connecting causes profile information of the user to be sent to the advertiser's location over the network. The profile at the advertiser's location is then received, and information generated to forward to the user based upon the user's profile forwarded thereto. This information is then forward to the connected user.

4 Claims, 12 Drawing Sheets

U.S. PATENT DOCUMENTS

| | | |
|---|---|---|
| 3,886,328 A | 5/1975 | Harms, Jr. et al. |
| 4,002,886 A | 1/1977 | Sundelin |
| 4,042,792 A | 8/1977 | Pakenham et al. |
| 4,365,148 A | 12/1982 | Whitney |
| 4,471,218 A | 9/1984 | Culp |
| 4,538,174 A | 8/1985 | Gargini et al. |
| 4,546,352 A | 10/1985 | Goldman |
| 4,581,484 A | 4/1986 | Bendig |
| 4,621,259 A | 11/1986 | Schepers et al. |
| 4,642,790 A | 2/1987 | Minshull et al. |
| 4,654,482 A | 3/1987 | DeAngelis |
| 4,672,377 A | 6/1987 | Murphy et al. |
| 4,710,727 A | 12/1987 | Rutt |
| 4,780,599 A | 10/1988 | Baus |
| 4,783,648 A | 11/1988 | Homma et al. |
| 4,785,296 A | 11/1988 | Tabata et al. |
| 4,789,147 A | 12/1988 | Berger et al. |
| 4,816,904 A | 3/1989 | McKenna et al. |
| 4,817,136 A | 3/1989 | Rhoads |
| 4,823,108 A | 4/1989 | Pope |
| 4,823,303 A | 4/1989 | Terasawa |
| 4,833,308 A | 5/1989 | Humble |
| 4,841,132 A | 6/1989 | Kajitani et al. |
| 4,845,634 A | 7/1989 | Vitek et al. |
| 4,850,009 A | 7/1989 | Zook et al. |
| 4,866,431 A | 9/1989 | Andros et al. |
| 4,890,098 A | 12/1989 | Dawes et al. |
| 4,893,333 A | 1/1990 | Baran et al. |
| 4,894,789 A | 1/1990 | Yee |
| 4,896,148 A | 1/1990 | Kurita |
| 4,899,370 A | 2/1990 | Kameo et al. |
| 4,901,073 A | 2/1990 | Kibrick |
| 4,905,094 A | 2/1990 | Pocock et al. |
| 4,907,264 A | 3/1990 | Seiler et al. |
| 4,916,293 A | 4/1990 | Cartlidge et al. |
| 4,937,853 A | 6/1990 | Brule et al. |
| 4,947,028 A | 8/1990 | Gorog |
| 4,959,530 A | 9/1990 | O'Connor |
| 4,972,504 A | 11/1990 | Daniel et al. |
| 4,975,948 A | 12/1990 | Andresen et al. |
| 4,982,346 A | 1/1991 | Girouard et al. |
| 4,983,817 A | 1/1991 | Dolash et al. |
| 4,984,155 A | 1/1991 | Geier et al. |
| 5,003,384 A | 3/1991 | Durden et al. |
| 5,038,023 A | 8/1991 | Saliga |
| 5,039,075 A | 8/1991 | Mayer |
| 5,047,614 A | 9/1991 | Bianco |
| 5,054,096 A | 10/1991 | Beizer |
| 5,060,170 A | 10/1991 | Bourgeois et al. |
| 5,088,045 A | 2/1992 | Shimanaka et al. |
| 5,111,391 A | 5/1992 | Fields et al. |
| 5,115,326 A | 5/1992 | Burgess et al. |
| 5,128,752 A | 7/1992 | Von Kohorn |
| 5,133,011 A | 7/1992 | McKiel, Jr. |
| 5,144,654 A | 9/1992 | Kelley et al. |
| 5,161,037 A | 11/1992 | Saito |
| 5,161,214 A | 11/1992 | Addink et al. |
| 5,175,422 A | 12/1992 | Koizumi et al. |
| 5,179,700 A | 1/1993 | Aihara et al. |
| 5,182,705 A | 1/1993 | Barr et al. |
| 5,189,630 A | 2/1993 | Barstow et al. |
| 5,191,525 A | 3/1993 | LeBrun et al. |
| 5,198,644 A | 3/1993 | Pfeiffer et al. |
| 5,213,337 A | 5/1993 | Sherman |
| 5,227,771 A | 7/1993 | Kerr et al. |
| 5,233,171 A | 8/1993 | Baldwin |
| 5,235,654 A | 8/1993 | Anderson et al. |
| 5,241,402 A | 8/1993 | Aboujaoude et al. |
| 5,243,531 A | 9/1993 | DiPippo et al. |
| 5,247,347 A | 9/1993 | Litteral et al. |
| 5,249,044 A | 9/1993 | Von Kohorn |
| 5,250,789 A | 10/1993 | Johnsen |
| 5,262,860 A | 11/1993 | Fitzpatrick et al. |
| 5,280,498 A | 1/1994 | Tymes et al. |
| 5,285,278 A | 2/1994 | Holman |
| 5,287,181 A | 2/1994 | Holman |
| 5,288,976 A | 2/1994 | Citron et al. |
| 5,296,688 A | 3/1994 | Hamilton et al. |
| 5,304,786 A | 4/1994 | Pavlidis et al. |
| 5,305,195 A | 4/1994 | Murphy |
| 5,319,454 A | 6/1994 | Schutte |
| 5,319,455 A | 6/1994 | Hoarty et al. |
| 5,324,922 A | 6/1994 | Roberts |
| 5,331,547 A | 7/1994 | Laszlo |
| 5,340,966 A | 8/1994 | Morimoto |
| 5,341,505 A | 8/1994 | Whitehouse |
| 5,349,678 A | 9/1994 | Morris et al. |
| 5,354,977 A | 10/1994 | Roustaei |
| 5,355,146 A | 10/1994 | Chiu et al. |
| 5,357,276 A | 10/1994 | Banker et al. |
| 5,359,367 A | 10/1994 | Stockill |
| 5,361,871 A | 11/1994 | Gupta et al. |
| 5,362,948 A | 11/1994 | Morimoto |
| 5,372,334 A | 12/1994 | Cuadros |
| 5,377,323 A | 12/1994 | Vasudevan |
| 5,382,779 A | 1/1995 | Gupta |
| 5,382,948 A | 1/1995 | Richmond |
| 5,386,298 A | 1/1995 | Bronnenberg et al. |
| 5,398,336 A | 3/1995 | Tantry et al. |
| 5,405,232 A | 4/1995 | Lloyd et al. |
| 5,418,713 A | 5/1995 | Allen |
| 5,420,403 A | 5/1995 | Allum et al. |
| 5,420,943 A | 5/1995 | Mak |
| 5,424,524 A | 6/1995 | Ruppert et al. |
| 5,426,427 A | 6/1995 | Chinnock et al. |
| 5,431,250 A | 7/1995 | Schlamp |
| 5,438,355 A | 8/1995 | Palmer |
| 5,442,749 A | 8/1995 | Northcutt et al. |
| 5,446,490 A | 8/1995 | Blahut et al. |
| 5,446,919 A | 8/1995 | Wilkins |
| 5,457,307 A | 10/1995 | Dumont |
| 5,465,291 A | 11/1995 | Barrus et al. |
| 5,483,052 A | 1/1996 | Smith et al. |
| 5,483,640 A | 1/1996 | Isfeld et al. |
| 5,491,495 A | 2/1996 | Ward et al. |
| 5,491,508 A | 2/1996 | Friedell et al. |
| 5,493,107 A | 2/1996 | Gupta et al. |
| 5,507,009 A | 4/1996 | Grube et al. |
| 5,519,878 A | 5/1996 | Dolin, Jr. |
| 5,523,982 A | 6/1996 | Dale |
| 5,530,852 A | 6/1996 | Meske, Jr. et al. |
| 5,532,773 A | 7/1996 | Shaw et al. |
| 5,548,110 A | 8/1996 | Storch et al. |
| 5,563,630 A | 10/1996 | Tsakiris et al. |
| 5,570,295 A | 10/1996 | Isenberg et al. |
| 5,572,643 A | 11/1996 | Judson |
| 5,578,818 A | 11/1996 | Kain et al. |
| 5,579,124 A | 11/1996 | Aijala et al. |
| 5,586,313 A | 12/1996 | Schnittker et al. |
| 5,590,197 A | 12/1996 | Chen et al. |
| 5,592,551 A | 1/1997 | Lett et al. |
| 5,594,226 A | 1/1997 | Steger |
| 5,595,264 A | 1/1997 | Trotta, Jr. |
| 5,600,779 A | 2/1997 | Palmer et al. |
| 5,602,377 A | 2/1997 | Beller et al. |
| 5,604,542 A | 2/1997 | Dedrick |
| 5,621,203 A | 4/1997 | Swartz et al. |
| 5,633,484 A | 5/1997 | Zancho et al. |
| 5,633,489 A | 5/1997 | Dvorkis et al. |
| 5,636,346 A | 6/1997 | Saxe |
| 5,640,002 A | 6/1997 | Ruppert et al. |
| 5,640,193 A | 6/1997 | Wellner |
| 5,646,390 A | 7/1997 | Wang et al. |
| 5,649,186 A | 7/1997 | Ferguson |

| Patent No. | Date | Inventor |
|---|---|---|
| 5,659,800 A | 8/1997 | Zhang et al. |
| 5,664,110 A | 9/1997 | Green et al. |
| 5,666,293 A | 9/1997 | Metz et al. |
| 5,671,226 A | 9/1997 | Murakami et al. |
| 5,671,282 A | 9/1997 | Wolff et al. |
| 5,673,322 A | 9/1997 | Pepe et al. |
| 5,675,721 A | 10/1997 | Freedman et al. |
| 5,682,540 A | 10/1997 | Klotz, Jr. et al. |
| 5,687,331 A | 11/1997 | Volk et al. |
| 5,694,163 A | 12/1997 | Harrison |
| 5,701,161 A | 12/1997 | Williams et al. |
| 5,704,029 A | 12/1997 | Wright, Jr. |
| 5,708,478 A | 1/1998 | Tognazzini |
| 5,708,780 A | 1/1998 | Levergood et al. |
| 5,710,887 A | 1/1998 | Chelliah et al. |
| 5,715,314 A | 2/1998 | Payne et al. |
| 5,721,848 A | 2/1998 | Joseph |
| 5,724,424 A | 3/1998 | Gifford |
| 5,726,898 A | 3/1998 | Jacobs |
| 5,729,002 A | 3/1998 | Samples |
| 5,732,218 A | 3/1998 | Bland et al. |
| 5,734,413 A | 3/1998 | Lappington et al. |
| 5,737,532 A | 4/1998 | DeLair et al. |
| 5,737,619 A | 4/1998 | Judson |
| 5,740,369 A | 4/1998 | Yokozawa et al. |
| 5,742,825 A | 4/1998 | Mather et al. |
| 5,745,681 A | 4/1998 | Levine et al. |
| 5,746,602 A | 5/1998 | Kikinis |
| 5,751,956 A | 5/1998 | Kursch |
| 5,754,906 A | 5/1998 | Yoshida |
| 5,754,981 A | 5/1998 | Veeneman et al. |
| 5,757,917 A | 5/1998 | Rose et al. |
| 5,758,257 A | 5/1998 | Herz et al. |
| 5,761,606 A * | 6/1998 | Wolzien ..................... 725/110 |
| 5,761,648 A | 6/1998 | Golden et al. |
| 5,764,906 A | 6/1998 | Edelstein et al. |
| 5,765,176 A | 6/1998 | Bloomberg |
| 5,768,508 A | 6/1998 | Eikeland |
| 5,768,528 A | 6/1998 | Stumm |
| 5,768,539 A | 6/1998 | Metz et al. |
| 5,768,583 A | 6/1998 | Orzol et al. |
| 5,774,170 A | 6/1998 | Hite et al. |
| 5,774,534 A | 6/1998 | Mayer |
| 5,774,660 A | 6/1998 | Brendel et al. |
| 5,774,664 A | 6/1998 | Hidary et al. |
| 5,774,666 A | 6/1998 | Portuesi |
| 5,774,870 A | 6/1998 | Storey |
| 5,774,874 A | 6/1998 | Veeneman et al. |
| 5,778,181 A | 7/1998 | Hidary et al. |
| 5,778,367 A | 7/1998 | Wesinger, Jr. et al. |
| 5,786,585 A | 7/1998 | Eastman et al. |
| 5,787,246 A | 7/1998 | Lichtman et al. |
| 5,790,793 A | 8/1998 | Higley |
| 5,791,991 A | 8/1998 | Small |
| 5,794,210 A | 8/1998 | Goldhaber et al. |
| 5,796,952 A | 8/1998 | Davis et al. |
| 5,801,067 A | 9/1998 | Shaw et al. |
| 5,804,803 A | 9/1998 | Cragun et al. |
| 5,805,154 A | 9/1998 | Brown |
| 5,805,806 A | 9/1998 | McArthur |
| 5,806,044 A | 9/1998 | Powell |
| 5,812,776 A | 9/1998 | Gifford |
| 5,815,776 A | 9/1998 | Nukada |
| 5,818,438 A | 10/1998 | Howe et al. |
| 5,818,440 A | 10/1998 | Allibhoy et al. |
| 5,818,441 A | 10/1998 | Throckmorton et al. |
| 5,818,935 A | 10/1998 | Maa |
| 5,822,436 A | 10/1998 | Rhoads |
| 5,825,009 A | 10/1998 | Schmid et al. |
| 5,826,000 A | 10/1998 | Hamilton |
| 5,826,064 A | 10/1998 | Loring et al. |
| 5,826,166 A | 10/1998 | Brooks et al. |
| 5,831,261 A | 11/1998 | Plesko |
| 5,832,223 A | 11/1998 | Hara et al. |
| 5,832,432 A | 11/1998 | Trader et al. |
| 5,832,449 A | 11/1998 | Cunningham |
| 5,833,468 A | 11/1998 | Guy et al. |
| 5,835,861 A | 11/1998 | Whiteside |
| 5,835,911 A | 11/1998 | Nakagawa et al. |
| 5,842,178 A | 11/1998 | Giovannoli |
| 5,848,202 A | 12/1998 | D'Eri et al. |
| 5,848,292 A | 12/1998 | Nathan |
| 5,848,397 A | 12/1998 | Marsh et al. |
| 5,848,413 A | 12/1998 | Wolff |
| 5,848,426 A | 12/1998 | Wang et al. |
| 5,850,187 A | 12/1998 | Carrender et al. |
| 5,854,897 A | 12/1998 | Radziewicz et al. |
| 5,854,945 A | 12/1998 | Criscito et al. |
| 5,862,452 A | 1/1999 | Cudak et al. |
| 5,864,823 A | 1/1999 | Levitan |
| 5,867,730 A | 2/1999 | Leyda |
| 5,869,819 A | 2/1999 | Knowles et al. |
| 5,870,546 A | 2/1999 | Kursch |
| 5,872,588 A | 2/1999 | Aras et al. |
| 5,874,722 A | 2/1999 | Rando et al. |
| 5,875,327 A | 2/1999 | Brandt et al. |
| 5,875,415 A | 2/1999 | Lieb et al. |
| 5,880,769 A | 3/1999 | Nemirofsky et al. |
| 5,884,014 A | 3/1999 | Huttenlocher et al. |
| 5,886,634 A | 3/1999 | Muhme |
| 5,887,176 A | 3/1999 | Griffith et al. |
| 5,887,243 A | 3/1999 | Harvey et al. |
| 5,894,516 A | 4/1999 | Brandenburg |
| 5,903,225 A | 5/1999 | Schmitt et al. |
| 5,903,721 A | 5/1999 | Sixtus |
| 5,905,248 A | 5/1999 | Russell et al. |
| 5,905,251 A | 5/1999 | Knowles |
| 5,905,521 A | 5/1999 | Gatto et al. |
| 5,905,665 A | 5/1999 | Rim |
| 5,905,865 A | 5/1999 | Palmer et al. |
| 5,907,322 A | 5/1999 | Kelly et al. |
| 5,907,793 A | 5/1999 | Reams |
| 5,909,183 A | 6/1999 | Borgstahl et al. |
| 5,912,454 A | 6/1999 | Castillo et al. |
| 5,913,210 A | 6/1999 | Call |
| 5,915,090 A | 6/1999 | Joseph et al. |
| 5,916,024 A | 6/1999 | Von Kohorn |
| 5,917,725 A | 6/1999 | Thacher et al. |
| 5,918,211 A | 6/1999 | Sloane |
| 5,918,213 A | 6/1999 | Bernard et al. |
| 5,918,214 A | 6/1999 | Perkowski |
| 5,923,735 A | 7/1999 | Swartz et al. |
| 5,923,806 A | 7/1999 | Sugawara |
| 5,925,865 A | 7/1999 | Steger |
| 5,929,849 A | 7/1999 | Kikinis |
| 5,929,850 A | 7/1999 | Broadwin et al. |
| 5,930,767 A | 7/1999 | Reber et al. |
| 5,932,863 A | 8/1999 | Rathus et al. |
| 5,933,811 A | 8/1999 | Angles et al. |
| 5,933,829 A | 8/1999 | Durst et al. |
| 5,935,004 A | 8/1999 | Tarr et al. |
| 5,937,163 A | 8/1999 | Lee et al. |
| 5,938,726 A | 8/1999 | Reber et al. |
| 5,938,727 A | 8/1999 | Ikeda |
| 5,940,073 A | 8/1999 | Klosterman et al. |
| 5,943,432 A | 8/1999 | Gilmore et al. |
| 5,944,791 A | 8/1999 | Scherpbier |
| 5,946,103 A | 8/1999 | Curry |
| 5,947,746 A | 9/1999 | Tsai |
| 5,948,061 A | 9/1999 | Merriman et al. |
| 5,950,173 A | 9/1999 | Perkowski |
| 5,951,639 A | 9/1999 | MacInnis |
| 5,956,699 A | 9/1999 | Wong et al. |
| 5,957,695 A | 9/1999 | Redford et al. |
| 5,959,275 A | 9/1999 | Hughes et al. |
| 5,960,411 A | 9/1999 | Hartman et al. |

| Patent No. | Date | Inventor(s) | Patent No. | Date | Inventor(s) |
|---|---|---|---|---|---|
| 5,961,603 A | 10/1999 | Kunkel et al. | 6,078,321 A | 6/2000 | Simonoff et al. |
| 5,963,916 A | 10/1999 | Kaplan | 6,081,629 A | 6/2000 | Browning |
| 5,963,926 A | 10/1999 | Kumomura | 6,084,523 A | 7/2000 | Gelnovatch et al. |
| 5,970,469 A | 10/1999 | Scroggie et al. | 6,085,146 A | 7/2000 | Kuribayashi et al. |
| 5,970,471 A | 10/1999 | Hill | 6,085,247 A | 7/2000 | Parsons, Jr. et al. |
| 5,970,472 A | 10/1999 | Allsop et al. | 6,097,375 A | 8/2000 | Byford |
| 5,971,277 A | 10/1999 | Cragun et al. | 6,098,106 A | 8/2000 | Philyaw et al. |
| 5,973,684 A | 10/1999 | Brooks et al. | 6,101,483 A | 8/2000 | Petrovich et al. |
| 5,974,443 A | 10/1999 | Jeske | 6,104,845 A | 8/2000 | Lipman et al. |
| 5,974,451 A | 10/1999 | Simmons | 6,108,656 A | 8/2000 | Durst et al. |
| 5,976,833 A | 11/1999 | Furukawa et al. | 6,108,706 A | 8/2000 | Birdwell et al. |
| 5,978,773 A * | 11/1999 | Hudetz et al. ............... 709/219 | 6,112,323 A | 8/2000 | Meizlik et al. |
| 5,979,757 A | 11/1999 | Tracy et al. | 6,112,981 A | 9/2000 | McCall |
| 5,986,651 A | 11/1999 | Reber et al. | 6,114,712 A | 9/2000 | Dvorkis et al. |
| 5,987,507 A | 11/1999 | Creedon et al. | 6,119,944 A | 9/2000 | Mulla et al. |
| 5,987,509 A | 11/1999 | Portuesi | 6,122,403 A | 9/2000 | Rhoads |
| 5,991,601 A | 11/1999 | Anderso | 6,122,740 A | 9/2000 | Andersen |
| 5,991,739 A | 11/1999 | Cupps et al. | 6,123,259 A | 9/2000 | Ogasawara |
| 5,991,749 A | 11/1999 | Morrill, Jr. | 6,123,263 A | 9/2000 | Feng |
| 5,992,744 A | 11/1999 | Smith et al. | 6,131,116 A | 10/2000 | Riggins et al. |
| 5,992,752 A | 11/1999 | Wilz, Sr. et al. | 6,133,849 A | 10/2000 | McConnell et al. |
| 5,995,105 A | 11/1999 | Reber et al. | 6,134,532 A | 10/2000 | Lazarus et al. |
| 5,995,965 A | 11/1999 | Experton | 6,134,548 A | 10/2000 | Gottsman et al. |
| 5,996,896 A | 12/1999 | Grabon | 6,134,616 A | 10/2000 | Beatty |
| 5,999,996 A | 12/1999 | Dunn | 6,138,036 A | 10/2000 | O'Cinneide |
| 6,002,394 A | 12/1999 | Schein et al. | 6,138,155 A | 10/2000 | Davis et al. |
| 6,002,852 A | 12/1999 | Birdwell et al. | 6,144,848 A | 11/2000 | Walsh et al. |
| 6,003,014 A | 12/1999 | Lee et al. | 6,148,301 A | 11/2000 | Rosenthal |
| 6,003,073 A | 12/1999 | Solvason | 6,148,331 A | 11/2000 | Parry |
| 6,005,939 A | 12/1999 | Fortenberry et al. | 6,148,405 A | 11/2000 | Liao et al. |
| 6,006,257 A | 12/1999 | Slezak | 6,149,063 A | 11/2000 | Reynolds et al. |
| 6,009,274 A | 12/1999 | Fletcher et al. | 6,151,624 A | 11/2000 | Teare et al. |
| 6,009,410 A | 12/1999 | LeMole et al. | 6,152,369 A | 11/2000 | Wilz, Sr. et al. |
| 6,009,465 A | 12/1999 | Decker et al. | 6,154,738 A | 11/2000 | Call |
| 6,012,038 A | 1/2000 | Powell | 6,154,771 A | 11/2000 | Rangan et al. |
| 6,012,045 A | 1/2000 | Barzilai et al. | 6,161,132 A | 12/2000 | Roberts et al. |
| 6,012,102 A | 1/2000 | Shachar | 6,163,803 A | 12/2000 | Watanabe |
| 6,014,090 A | 1/2000 | Rosen et al. | 6,167,567 A | 12/2000 | Chiles et al. |
| 6,014,634 A | 1/2000 | Scroggie et al. | 6,169,484 B1 | 1/2001 | Schuchman et al. |
| 6,014,641 A | 1/2000 | Loeb et al. | 6,170,746 B1 | 1/2001 | Brook et al. |
| 6,014,701 A | 1/2000 | Chaddha | 6,177,860 B1 | 1/2001 | Cromer et al. |
| 6,015,167 A | 1/2000 | Savino et al. | 6,178,443 B1 | 1/2001 | Lin |
| 6,018,764 A | 1/2000 | Field et al. | 6,181,351 B1 | 1/2001 | Merrill et al. |
| 6,023,255 A | 2/2000 | Bell | 6,185,542 B1 | 2/2001 | Moran et al. |
| 6,024,641 A | 2/2000 | Sarno | 6,185,589 B1 | 2/2001 | Votipka |
| 6,026,376 A | 2/2000 | Kenney et al. | 6,188,398 B1 | 2/2001 | Collins-Rector et al. |
| 6,029,045 A | 2/2000 | Picco et al. | 6,189,050 B1 | 2/2001 | Sakarda |
| 6,029,196 A | 2/2000 | Lenz | 6,192,380 B1 | 2/2001 | Light et al. |
| 6,032,195 A | 2/2000 | Reber et al. | 6,192,400 B1 | 2/2001 | Hanson et al. |
| 6,037,928 A | 3/2000 | Nachinson et al. | 6,195,420 B1 | 2/2001 | Tognazzini |
| 6,037,934 A | 3/2000 | Himmel et al. | 6,195,693 B1 | 2/2001 | Berry et al. |
| 6,038,366 A | 3/2000 | Ohno | 6,199,048 B1 | 3/2001 | Hudetz et al. |
| 6,044,362 A | 3/2000 | Neely | 6,199,079 B1 | 3/2001 | Gupta et al. |
| 6,045,048 A | 4/2000 | Wilz et al. | 6,202,054 B1 | 3/2001 | Lawlor et al. |
| 6,049,539 A | 4/2000 | Lee et al. | 6,202,062 B1 | 3/2001 | Cameron et al. |
| 6,049,870 A | 4/2000 | Greaves | 6,220,509 B1 | 4/2001 | Byford |
| 6,055,573 A | 4/2000 | Gardenswartz et al. | 6,226,618 B1 | 5/2001 | Downs et al. |
| 6,061,368 A | 5/2000 | Bendinelle et al. | 6,230,325 B1 | 5/2001 | Iinuma et al. |
| 6,061,440 A | 5/2000 | Delaney et al. | 6,233,565 B1 | 5/2001 | Lewis et al. |
| 6,061,646 A | 5/2000 | Martino et al. | 6,233,736 B1 | 5/2001 | Wolzien |
| 6,061,660 A | 5/2000 | Eggleston et al. | 6,236,836 B1 | 5/2001 | Westman et al. |
| 6,061,719 A | 5/2000 | Bendinelli et al. | 6,237,025 B1 | 5/2001 | Ludwig et al. |
| 6,064,804 A | 5/2000 | Brink et al. | 6,238,290 B1 | 5/2001 | Tarr et al. |
| 6,064,929 A | 5/2000 | Migues et al. | 6,240,448 B1 | 5/2001 | Imielinski et al. |
| 6,064,979 A | 5/2000 | Perkowski | 6,243,814 B1 | 6/2001 | Matena |
| 6,067,526 A | 5/2000 | Powell | 6,247,047 B1 | 6/2001 | Wolff |
| 6,070,147 A | 5/2000 | Harms et al. | 6,247,128 B1 | 6/2001 | Fisher et al. |
| 6,070,160 A | 5/2000 | Geary | 6,249,810 B1 | 6/2001 | Kiraly |
| 6,070,798 A | 6/2000 | Nethery | 6,251,016 B1 | 6/2001 | Tsuda et al. |
| 6,073,119 A | 6/2000 | Bornemisza-Wahr et al. | 6,251,017 B1 | 6/2001 | Leason et al. |
| 6,073,851 A | 6/2000 | Olmstead et al. | 6,256,498 B1 | 7/2001 | Ludwig |
| 6,076,166 A | 6/2000 | Moshfeghi et al. | 6,256,732 B1 | 7/2001 | Cromer et al. |
| 6,076,733 A | 6/2000 | Wilz, Sr. et al. | 6,260,023 B1 | 7/2001 | Seevers et al. |

| Patent Number | Date | Inventor |
|---|---|---|
| 6,263,383 B1 | 7/2001 | Lee et al. |
| 6,278,717 B1 | 8/2001 | Arsenault et al. |
| 6,279,830 B1 | 8/2001 | Ishibashi |
| 6,282,522 B1 | 8/2001 | Davis et al. |
| 6,282,713 B1 | 8/2001 | Kitsukawa et al. |
| 6,290,131 B1 | 9/2001 | Kolis et al. |
| 6,292,786 B1 | 9/2001 | Deaton et al. |
| 6,297,727 B1 | 10/2001 | Nelson, Jr. |
| 6,297,819 B1 | 10/2001 | Furst |
| 6,298,373 B1 | 10/2001 | Burns et al. |
| 6,300,872 B1 | 10/2001 | Mathias et al. |
| 6,301,012 B1 | 10/2001 | White et al. |
| 6,301,612 B1 | 10/2001 | Selitrennikoff et al. |
| 6,308,893 B1 | 10/2001 | Waxelbaum et al. |
| 6,311,165 B1 | 10/2001 | Coutts et al. |
| 6,311,185 B1 | 10/2001 | Markowitz et al. |
| 6,311,214 B1 | 10/2001 | Rhoads |
| 6,311,896 B1 | 11/2001 | Mulla et al. |
| 6,314,451 B1 | 11/2001 | Landsman et al. |
| 6,314,456 B1 | 11/2001 | Van Andel et al. |
| 6,317,761 B1 | 11/2001 | Landsman et al. |
| 6,317,780 B1 | 11/2001 | Cohn et al. |
| 6,317,789 B1 | 11/2001 | Rakavy et al. |
| 6,317,791 B1 | 11/2001 | Cohn et al. |
| 6,317,885 B1 | 11/2001 | Fries |
| 6,321,991 B1 | 11/2001 | Knowles |
| 6,321,992 B1 | 11/2001 | Knowles et al. |
| 6,324,519 B1 | 11/2001 | Eldering |
| 6,327,574 B1 | 12/2001 | Kramer et al. |
| 6,328,213 B1 | 12/2001 | He et al. |
| 6,330,543 B1 | 12/2001 | Kepecs |
| 6,330,593 B1 | 12/2001 | Roberts et al. |
| 6,330,595 B1 | 12/2001 | Ullman et al. |
| 6,330,669 B1 | 12/2001 | McKeeth |
| 6,330,715 B1 | 12/2001 | Razzaghe-Ashrafi |
| 6,331,972 B1 | 12/2001 | Harris et al. |
| 6,334,113 B1 | 12/2001 | Walker et al. |
| 6,336,152 B1 | 1/2002 | Richman et al. |
| 6,337,717 B1 | 1/2002 | Nason et al. |
| 6,338,094 B1 | 1/2002 | Scott et al. |
| 6,343,276 B1 | 1/2002 | Barnett |
| 6,351,467 B1 | 2/2002 | Dillon |
| 6,351,640 B1 | 2/2002 | DeMont |
| 6,353,898 B1 | 3/2002 | Wipfel et al. |
| 6,353,926 B1 | 3/2002 | Parthesarathy et al. |
| 6,353,929 B1 | 3/2002 | Houston |
| 6,356,876 B1 | 3/2002 | Lingham |
| 6,357,042 B2 | 3/2002 | Srinivasan et al. |
| 6,359,711 B1 | 3/2002 | Cole et al. |
| 6,368,177 B1 | 4/2002 | Gabai et al. |
| 6,374,237 B1 * | 4/2002 | Reese ......................... 709/217 |
| 6,374,402 B1 | 4/2002 | Schmeidler et al. |
| 6,377,690 B1 | 4/2002 | Witschorik |
| 6,377,930 B1 | 4/2002 | Chen et al. |
| 6,377,983 B1 | 4/2002 | Cohen et al. |
| 6,377,986 B1 | 4/2002 | Philyaw et al. |
| 6,381,632 B1 | 4/2002 | Lowell |
| 6,384,744 B1 | 5/2002 | Philyaw et al. |
| 6,386,454 B2 | 5/2002 | Hecht et al. |
| 6,389,409 B1 | 5/2002 | Horovitz et al. |
| 6,389,464 B1 | 5/2002 | Krishnamurthy et al. |
| 6,393,297 B1 | 5/2002 | Song |
| 6,394,354 B1 | 5/2002 | Wilz et al. |
| 6,398,106 B1 | 6/2002 | Ulvr et al. |
| 6,400,272 B1 | 6/2002 | Holtzman et al. |
| 6,400,407 B1 | 6/2002 | Zigmond et al. |
| 6,401,059 B1 | 6/2002 | Shen et al. |
| 6,401,077 B1 | 6/2002 | Godden et al. |
| 6,404,435 B1 | 6/2002 | Miller et al. |
| 6,405,049 B2 | 6/2002 | Herrod et al. |
| 6,412,699 B1 | 7/2002 | Russell et al. |
| 6,415,438 B1 | 7/2002 | Blackketter et al. |
| 6,415,439 B1 | 7/2002 | Randell et al. |
| 6,415,983 B1 | 7/2002 | Ulvr et al. |
| 6,418,441 B1 | 7/2002 | Call |
| 6,418,555 B2 | 7/2002 | Mohammed |
| 6,421,445 B1 | 7/2002 | Jensen et al. |
| 6,421,732 B1 | 7/2002 | Alkhatib et al. |
| 6,424,249 B1 | 7/2002 | Houvener |
| 6,427,238 B1 | 7/2002 | Goodman et al. |
| 6,430,554 B1 | 8/2002 | Rothschild |
| 6,430,743 B1 | 8/2002 | Matsuura |
| 6,434,530 B1 | 8/2002 | Sloane et al. |
| 6,442,529 B1 | 8/2002 | Krishan et al. |
| 6,442,530 B1 | 8/2002 | Miller |
| 6,446,049 B1 | 9/2002 | Janning et al. |
| 6,446,119 B1 | 9/2002 | Olah et al. |
| 6,446,871 B1 | 9/2002 | Buckley et al. |
| 6,449,518 B1 | 9/2002 | Yokoo et al. |
| 6,459,439 B1 | 10/2002 | Ahlquist et al. |
| 6,460,093 B1 | 10/2002 | Taugher |
| 6,463,416 B1 | 10/2002 | Messina |
| 6,463,420 B1 | 10/2002 | Guidice et al. |
| 6,469,689 B1 | 10/2002 | Dow et al. |
| 6,484,022 B1 | 11/2002 | Findikli et al. |
| 6,484,149 B1 | 11/2002 | Jammes et al. |
| 6,484,198 B1 | 11/2002 | Milovanovic et al. |
| 6,487,538 B1 | 11/2002 | Gupta et al. |
| 6,487,719 B1 | 11/2002 | Itoh et al. |
| 6,490,601 B1 | 12/2002 | Markus et al. |
| 6,490,637 B1 | 12/2002 | Shih |
| 6,493,770 B1 | 12/2002 | Sartore et al. |
| 6,496,858 B1 | 12/2002 | Frailong et al. |
| 6,496,981 B1 | 12/2002 | Wistendahl et al. |
| 6,501,854 B1 | 12/2002 | Konishi et al. |
| 6,502,242 B1 | 12/2002 | Howe et al. |
| 6,504,626 B1 | 1/2003 | Shih |
| 6,510,997 B1 | 1/2003 | Wilz et al. |
| 6,512,522 B1 | 1/2003 | Miller et al. |
| 6,513,717 B2 | 2/2003 | Hannigan |
| 6,517,002 B1 | 2/2003 | Piatek |
| 6,519,463 B2 | 2/2003 | Tendler |
| 6,526,449 B1 | 2/2003 | Philyaw et al. |
| 6,536,666 B1 | 3/2003 | Hudrick |
| 6,536,670 B1 | 3/2003 | Postman et al. |
| 6,540,144 B1 | 4/2003 | Hudrick et al. |
| 6,542,874 B1 | 4/2003 | Walker et al. |
| 6,542,933 B1 | 4/2003 | Durst et al. |
| 6,542,943 B2 | 4/2003 | Cheng et al. |
| 6,543,052 B1 | 4/2003 | Ogasawara |
| 6,546,418 B2 | 4/2003 | Schena et al. |
| 6,560,640 B2 | 5/2003 | Smethers |
| 6,577,861 B2 | 6/2003 | Ogasawara |
| 6,577,877 B1 | 6/2003 | Charlier et al. |
| 6,580,870 B1 | 6/2003 | Kanazawa et al. |
| 6,581,838 B1 | 6/2003 | Meksavan et al. |
| 6,584,459 B1 | 6/2003 | Chang et al. |
| 6,587,835 B1 | 7/2003 | Treyz et al. |
| 6,591,247 B2 | 7/2003 | Stern |
| 6,594,705 B1 | 7/2003 | Philyaw |
| 6,595,859 B2 | 7/2003 | Lynn |
| 6,600,418 B2 | 7/2003 | Francis et al. |
| 6,600,496 B1 | 7/2003 | Wagner et al. |
| 6,600,725 B1 | 7/2003 | Roy |
| 6,601,172 B1 | 7/2003 | Epstein |
| 6,604,242 B1 | 8/2003 | Weinstein et al. |
| 6,604,681 B1 | 8/2003 | Burke et al. |
| 6,612,495 B2 | 9/2003 | Reddersen et al. |
| 6,615,268 B1 | 9/2003 | Philyaw et al. |
| 6,616,056 B2 | 9/2003 | Cato |
| 6,622,165 B1 | 9/2003 | Philyaw |
| 6,625,581 B1 | 9/2003 | Perkowski |
| 6,636,896 B1 | 10/2003 | Philyaw |
| 6,637,028 B1 | 10/2003 | Voyticky et al. |
| 6,645,068 B1 | 11/2003 | Kelly et al. |
| 6,661,904 B1 | 12/2003 | Sasich et al. |

| | | |
|---|---|---|
| 6,665,836 B1 | 12/2003 | Wynblatt et al. |
| 6,668,133 B2 | 12/2003 | Yuen et al. |
| 6,668,293 B2 | 12/2003 | Chen et al. |
| 6,678,866 B1 | 1/2004 | Sugimoto et al. |
| 6,686,910 B2 | 2/2004 | O'Donnell, Jr. |
| 6,688,522 B1 | 2/2004 | Philyaw et al. |
| 6,697,949 B1 | 2/2004 | Philyaw et al. |
| 6,701,354 B1 | 3/2004 | Philyaw et al. |
| 6,701,369 B1 | 3/2004 | Philyaw |
| 6,701,524 B1 | 3/2004 | Okamura et al. |
| 6,704,864 B1 | 3/2004 | Philyaw |
| 6,708,208 B1 | 3/2004 | Philyaw |
| 6,725,260 B1 | 4/2004 | Philyaw |
| 6,725,461 B1 | 4/2004 | Dougherty et al. |
| 6,738,978 B1 | 5/2004 | Hendricks et al. |
| 6,741,574 B2 | 5/2004 | Arsenault |
| 6,745,234 B1 | 6/2004 | Philyaw et al. |
| 6,748,278 B1 | 6/2004 | Maymudes |
| 6,753,883 B2 | 6/2004 | Schena et al. |
| 6,758,398 B1 | 7/2004 | Philyaw et al. |
| 6,778,096 B1 | 8/2004 | Ward et al. |
| 6,779,178 B1 | 8/2004 | Lloyd et al. |
| 6,785,659 B1 | 8/2004 | Landsman et al. |
| 6,791,588 B1 | 9/2004 | Gifford |
| 6,792,452 B1 | 9/2004 | Philyaw |
| 6,792,618 B1 | 9/2004 | Bendinelli et al. |
| 6,806,808 B1 | 10/2004 | Watters et al. |
| 6,813,608 B1 | 11/2004 | Baranowski |
| 6,813,776 B2 | 11/2004 | Chernock et al. |
| 6,816,894 B1 | 11/2004 | Philyaw et al. |
| 6,823,366 B1 | 11/2004 | Nakano |
| 6,826,775 B1 | 11/2004 | Howe et al. |
| 6,829,646 B1 | 12/2004 | Philyaw et al. |
| 6,829,650 B1 | 12/2004 | Philyaw et al. |
| 6,832,729 B1 | 12/2004 | Perry et al. |
| 6,836,799 B1 | 12/2004 | Philyaw et al. |
| 6,843,417 B1 | 1/2005 | Philyaw et al. |
| 6,845,388 B1 | 1/2005 | Philyaw |
| 6,857,131 B1 | 2/2005 | Yagawa et al. |
| 6,859,699 B2 | 2/2005 | Carroll et al. |
| 6,877,032 B1 | 4/2005 | Philyaw |
| 6,886,013 B1 | 4/2005 | Beranek |
| 6,886,178 B1 | 4/2005 | Mao et al. |
| 6,892,226 B1 | 5/2005 | Tso et al. |
| 6,961,555 B1 | 11/2005 | Philyaw |
| 6,961,712 B1 | 11/2005 | Perkowski |
| 6,970,916 B1 | 11/2005 | Philyaw |
| 6,988,248 B1 | 1/2006 | Tang et al. |
| 6,990,680 B1 | 1/2006 | Wugofski |
| 7,069,582 B2 | 6/2006 | Philyaw et al. |
| 7,110,981 B1 | 9/2006 | Sidikman et al. |
| 7,159,037 B1 | 1/2007 | Philyaw et al. |
| 7,200,865 B1 | 4/2007 | Roscoe et al. |
| 7,272,155 B2 | 9/2007 | Kenney et al. |
| 2002/0016770 A1 | 2/2002 | Flenley et al. |
| 2002/0059139 A1 | 5/2002 | Evans |

FOREIGN PATENT DOCUMENTS

| | | |
|---|---|---|
| DE | 19951881 | 5/2001 |
| EP | 0152341 | 8/1985 |
| EP | 0399200 A2 | 4/1990 |
| EP | 0569311 | 10/1993 |
| EP | 0601437 A1 | 6/1994 |
| EP | 0837406 | 4/1998 |
| EP | 0905984 A2 | 9/1998 |
| EP | 0921481 | 11/1998 |
| EP | 0889413 | 7/1999 |
| EP | 0927945 A2 | 7/1999 |
| EP | 0961250 | 12/1999 |
| GB | 2 307 628 A | 5/1997 |
| JP | 63276672 A | 11/1988 |
| JP | 10188140 | 12/1996 |
| JP | 11154131 | 6/1999 |
| NL | 1016278 | 3/2002 |
| WO | WO 91/03891 | 3/1991 |
| WO | WO 93/14476 | 7/1993 |
| WO | WO 95/10813 | 10/1994 |
| WO | WO 96/07146 | 9/1995 |
| WO | WO 95/28044 | 10/1995 |
| WO | WO 97/01137 A | 1/1997 |
| WO | WO 97/02074 | 1/1997 |
| WO | WO 97/37319 | 2/1997 |
| WO | WO 97/26061 | 6/1997 |
| WO | WO 98/08243 | 8/1997 |
| WO | WO 98/09243 | 8/1997 |
| WO | WO 97/33434 A1 | 9/1997 |
| WO | WO 98/03923 | 1/1998 |
| WO | WO 98/06055 | 2/1998 |
| WO | WO 98/19259 | 5/1998 |
| WO | WO 98/26548 | 6/1998 |
| WO | WO 98/38761 | 9/1998 |
| WO | WO 98/40823 | 9/1998 |
| WO | WO 98/41020 | 9/1998 |
| WO | WO 98/49813 | 11/1998 |
| WO | WO 98/53611 | 11/1998 |
| WO | WO 98/57490 | 12/1998 |
| WO | WO 99/00979 | 1/1999 |
| WO | WO 99/15968 | 4/1999 |
| WO | WO 99/21109 | 4/1999 |
| WO | WO 99/63457 | 6/1999 |
| WO | WO 99/38321 | 7/1999 |
| WO | WO 00/09229 | 2/2000 |
| WO | WO 00/16205 | 3/2000 |
| WO | WO 00/54182 A1 | 9/2000 |
| WO | WO 00/56072 | 9/2000 |

OTHER PUBLICATIONS

"Bell Atlantic Introduces Home Management Services in Washington Area" PR Newswire Jan. 9, 1993.

"Distributing Uniform Resource Locators as Bar Code Images," IBM Technical Disclosure Bulletin, No. 96A 60059, Jan. 1996, pp. 167-168.

"IEEE Standard for Bar Coding for Distribution Transformers" Transformers Committee of the IEEE Power Engineering Society, The Institute of Electrical and Electronics Engineers, Inc. NY. Jun. 20, 1996.

"Inexpensive set-top boxes unleash Internet TV", Japan Times (XAO) Sep. 10, 1998 p. 8 , dialog file 583, # 06689158.

"Integrating Traditional Media with the Web", web page located at www.webchoicetv.com/products, 4 pages, by WebChoice, Inc., Santa Monica, CA. Aug. 27, 1999.

"It's not interactive TV, but it's close enough" by Carl, Jeremy, WebWeek, Dec. 1, 1995, vol. 1, No. 8, p. 39, Dialog File 233, #00405621.

"Motorola i1000 cellular barcode scanner", Scan and go provides mobile computing solutions. Cellular barcode scanners, attached to cellular phones or wireless PDA's; retrieved from the Internet on Apr. 23, 2005.

"Newspaper Subscribers Use Symbol Bar-Code Pen Scanner to Capture Web Site Addresses Directly From Print Media" Business Wire. Dec. 21, 1998.

"PBS to transmit Web pages via TV signals -Web pages catch a ride on TV broadcasts" by Andrews, Whit, WebWeek, Apr. 2, 1997, v3 n12 p. 27, Dialog File 233, #00456769.

"Symbol CyberPen (previously known as InfoPen)", web page located at www.symbol.com/products/consumersystems/consumer cyberpen, 2 pgs; retrieved from the Internet on Aug. 27, 1999.

"Ubiquitous Advertising on the WWW: Merging Advertisement on the Browser," Kohda Y et al; Computer Networks and ISDN Systems, May 1, 1996, pp. 1493-1499, vol. 28, No. 11, North Holland Publishing, Amsterdam, NL.

"Web page for Symbol", located at www.symbol.com, 5 pgs; retrieved from the Internet on Aug. 27, 1999.

Adams, Russ, "Test Drive the symbol SPT 1500". Automatic I.D. News; Cleveland; Jan. 1999, vol. 15, Issue: 1, extracted from http://proquest.umi.com/pqd on Aug. 2, 2002.

Barrus, John W.; Holly, Krisztina; and Cassidy, Michael; "The Stylus.TM.—Shopping from Home;" Stylus Innovation, MA; Jan. 1992; IEEE, pp. 149-150.

Bragg, Steven M., Accounting Best Practices, John Wiley and Sons, Inc., 1999.

Curtis, S.P.; "Transponder technologies, applications and benefits" Use of Electronic Transponders in Automation, IEEE Colloquium on, Feb. 15, 1989 pp. 2/1-218.

de Bruyne, Pieter; "New Technologies in Credit Card Authentication;" Institute for Communications Technology, ETH Zentrum-KT, Zurich, Switzerland; Aug. 1990, IEEE, pp. 1-5.

Defler, Frank J. et. al. How Networks Work, Millennium Ed., Que Corporation, Nov. 2000.

Edwards, W. Keith et al. "Systematic Output Modification in a 2D User Interface Toolkit," Proceedings of the 10th ACM Symposium on User Interface Software and Technology (UIST '97) Oct. 14-17, 1997, pp. 1-8.

Gavan, J.; "Transponders for the detection and identification of remote cooperative targets" Telesystems Conference, 1994. Conference Proceedings., 1994 IEEE National, May 26-28, 1994 pp. 229-232.

Going Beyond the Banner by Cathy Taylor from Brandweek, v XXXVII, n28, IQ22+, dated Jul. 8, 1996.

Gooding, Mike, "Handheld Precision Test Data Collector", Autotestcon 97, 1997 IEEE Autotestcon Proceedings, pp. 323-326, Sep. 22-25, 1997, Anaheim, CA, USA, extracted from Internet on Aug. 2, 2002.

Gralla, Preston, How the Internet Works, Millennium Ed., Que Corporation, Aug. 8, 1999.

Hinton, William Frederick, et al.; "Document on Computer;" IPCC96 Fast Track, May 1996, IEEE, pp. 132-144. cited by other.

Iizawa, Atsushi; Sugiki, Noriro; Shirota, Yukari; and Kunii Hideko S.; "AVITAL, a Private Teaching System by Fax Communication", Software Research Center, Ricoh Company, Ltd.; Jun. 1992, IEEE, pp. 293-301. cited by other.

White, Ron, How Computers Work, Millennium Ed. Que Corporation; Sep. 1999.

Johnston, A.G.;"What do Forward Looking Companies Consider in their Plans and Developments?;" Nestle; IEE Colloquium, Oct. 12, 1997, pp. 4/1 to 4/4. cited by other.

Joyce, John, Steganography?; vol. 19, Issue 8, p. 12, Jul. 2002.

Keyes, Jessica, Handbook of Technology in Financial Services 1999, CRC Press, LLC, 1999.

van Renesse, Rudolf L.; "Paper Based Document Security—A Review;" TNO Institute of Applied Physics; European Conference on Security and Detection; Apr. 28-30, 1997; Conference Publication No. 437, IEE, 1997; pp. 75-80. cited by other.

Morrison, Tina-marie, Visa sets up website to encourage online buyers, Dominion, New Zealand, dated Aug. 24, 2000.

Muller, Nathan J., Desktop Encyclopedia of the Internet, Artech House, Inc., 1998.

Neves, Ricardo and Noivo, Joao; "The Automation Synergy;" ISIE '97, Guimaraes, Portugal; 1997; pp. 49-52. cited by other.

Ollivier, M.M.; "RFID-a practical solution for problems you didn't even know you had!" Wireless Technology (Digest No. 1996/199), IEE Colloquium on , Nov. 14, 1996 pp. 311-316.

PacTel jumps back into electronic directory business with At Hand (Pacific Telesis's Web-based directory of advertising,business listing and advertising), Electronic Marketplace Report, v10, p3(1). Jul. 1996.

PCT International Search Report; International Application No. PCT/US00/22037; Jan. 29, 2001; 4 pages.

PCT Notification of Transmittal of International Preliminary Examination Report; International Application No. PCT/US00/21494; Dec. 12, 2001; 7 pages.

PCT Written Opinion; International Application No. PCT/US00/22037; Dec. 5, 2001; 5 pages.

Restatement of the Law, Second, Contracts 2d, §§I-385 8 their Comments, American Law Institute, St. Paul MN, 1981.

Srihari, Sargur N. and Kuebert , Edward J.; "Integration of Hand-Written Address Interpretation Technology into the United States Postal Service Remote Computer Reader System;" Cedar, Suny at Buffalo and U.S. Postal Service; Apr. 1997, IEEE, pp. 892-896. cited by other.

Stein, Robert; Ferrero, Stephen; Hetfield, Margaret; Quinn, Alan and Krichever, Mark; "Development of a Commercially Successful Wearable Data Collection System"; Symbol Technologies, Inc.; Jul. 1998, IEEE, pp. 18-24. cited by other.

T. Berners-Lee et al., "Hypertext Transfer Protocol—HTTP/1.0", May 1996, Network Working Group, RFC1945, section 10.11.

Taylor, Bernard W., III, Introduction to Management Science, 5th Ed., Prentice-Hall Inc., NJ, 1996.

The Bank Credit Card Business. 2nd Edition. American Bankers Association, 1996.

Thomas, James W. and Nagle, Joan G.; "Group Decision Support System: Development and Application", Energy Systems, Westinghouse Electric Corporation; Feb. 1989, IEEE, pp. 213-216. cited by other.

U.P.C. Symbol Specification Manual, Uniform Code Council, Inc., Mar. 4, 1996.

White, James J. and Summers, Robert S. Uniform Commercial Code. 4th Ed. West Publishing Co., St. Paul MN, 1995.

Postel, J., Ed., A Memo from the Internet Architecture Board entitled, "Internet Official Protocol Standards." <ftp://ftp.rfc-editor.org/in-notes/rfc2000.txt.> Feb. 1997.

Yesil, Magdalena, "Creating the Virtual Store: taking your web site from browsing to buying ", John Wiley & Sons, Inc.; New York, 1997, pp. 52-55, under the heads, "Using the Virtual Store to Generate Revenue", "Advertising Revenue", "Revenue Based on Sales".

* cited by examiner

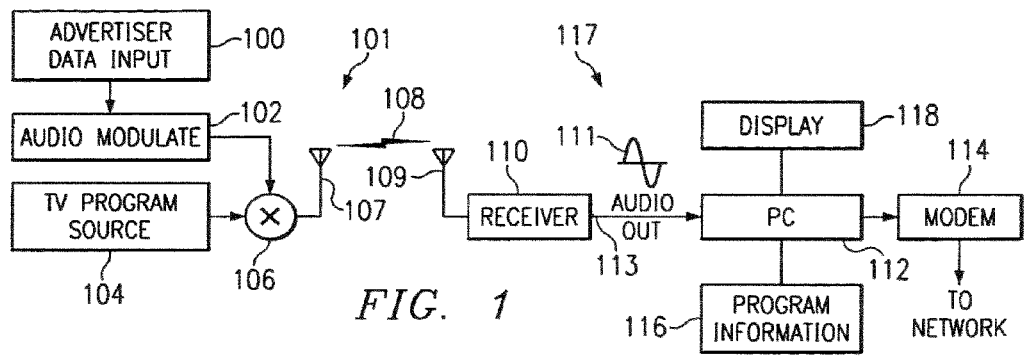
FIG. 1
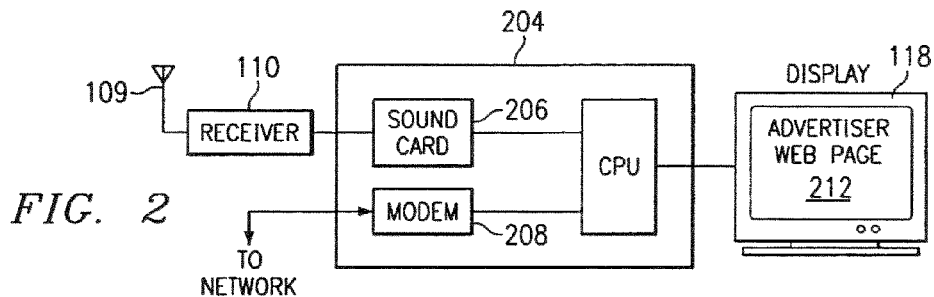
FIG. 2
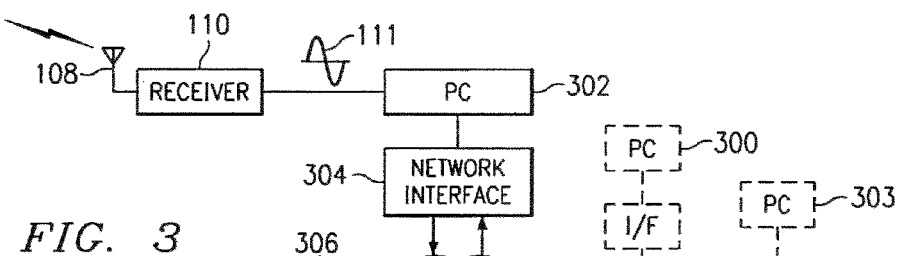
FIG. 3
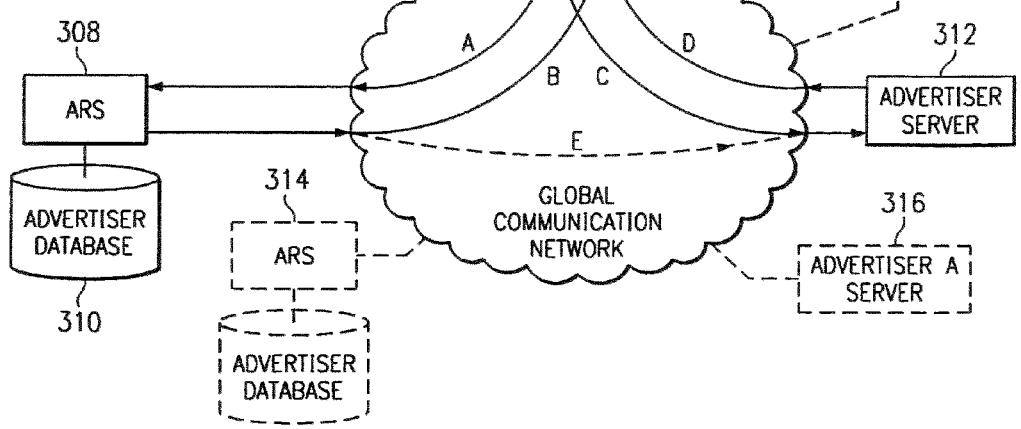

PATH A: SOURCE TO ARS

PATH B: ARS TO SOURCE

PATH C: SOURCE TO ADVERTISER

PATH D: ADVERTISER TO SOURCE

PATH E: ARS TO ADVERTISER (OPTIONAL)

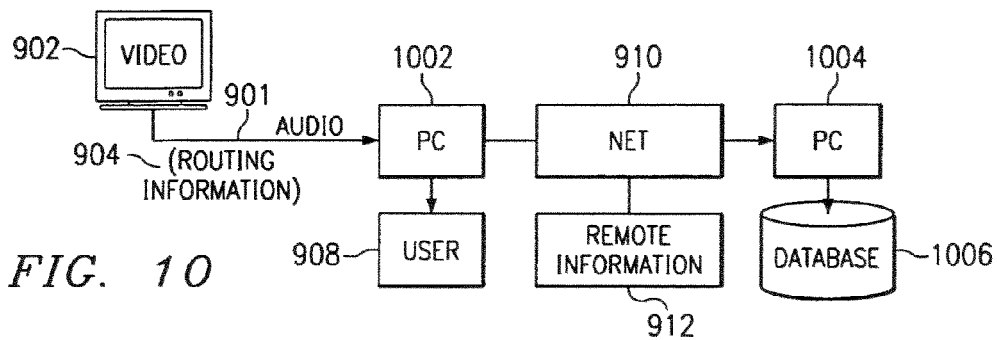
FIG. 10
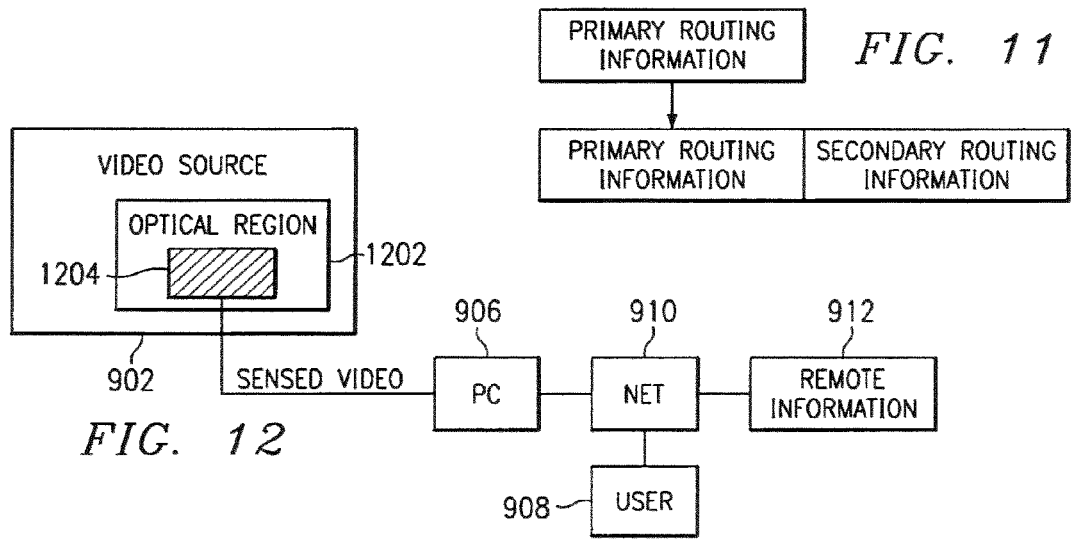
FIG. 11
FIG. 12
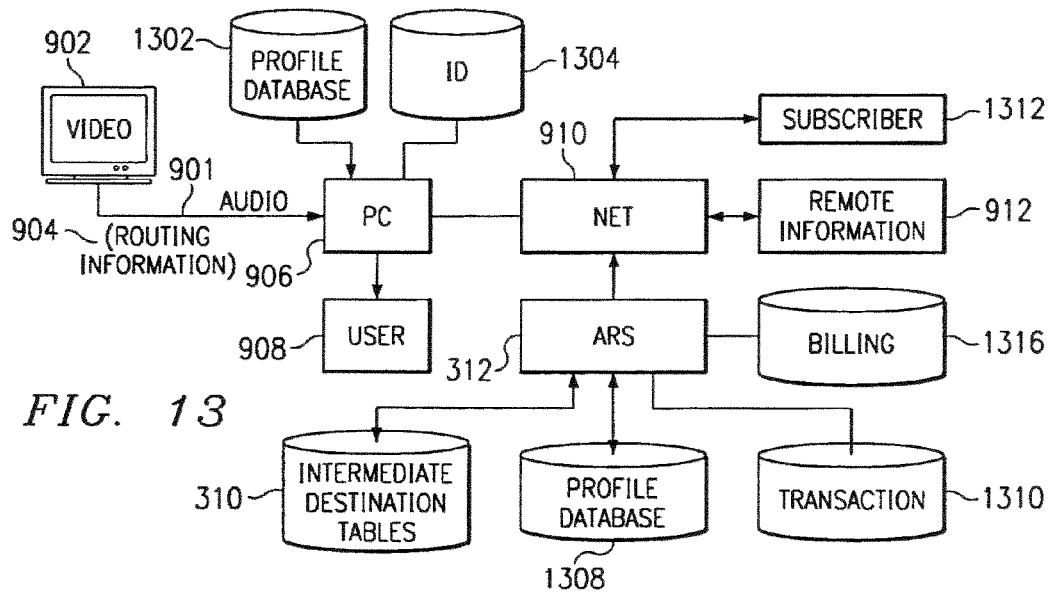
FIG. 13

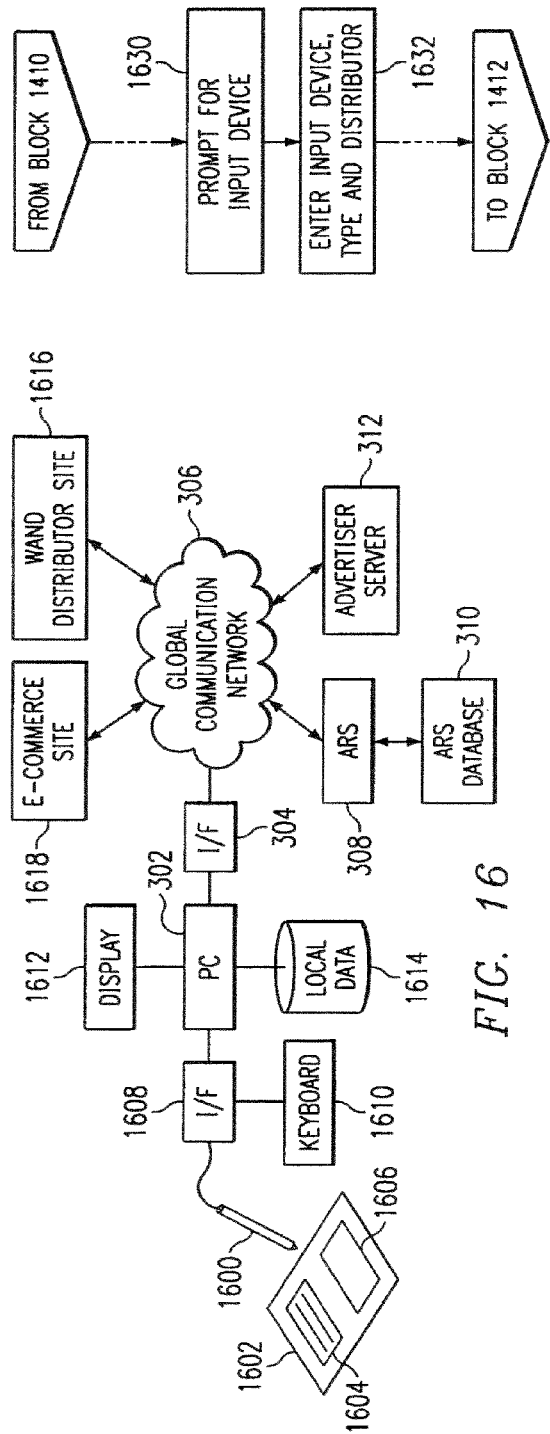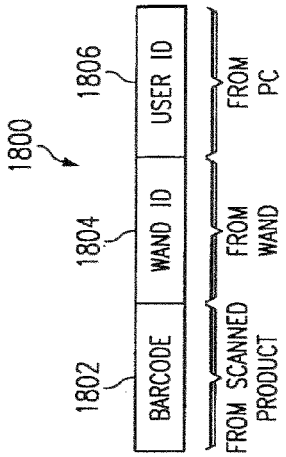

METHOD AND APPARATUS FOR MATCHING A USER'S USE PROFILE IN COMMERCE WITH A BROADCAST

CROSS-REFERENCE TO RELATED APPLICATIONS

This application is a Continuation of U.S. patent application Ser. No. 09/382,372, filed Aug. 24, 1999, which issued on Oct. 16, 2007 as U.S. Pat. No. 7,284,066, and entitled "METHOD AND APPARATUS FOR MATCHING A USER'S USE PROFILE IN COMMERCE WITH A BROADCAST", which is a Continuation-in-Part of U.S. patent application Ser. No. 09/378,221 entitled "METHOD AND APPARATUS FOR ACCESSING A REMOTE LOCATION BY SCANNING AN OPTICAL CODE," filed on Aug. 19, 1999, which issued on Jun. 1, 2004 as U.S. Pat. No. 6,745,234, which is a Continuation-in-Part of U.S. patent application Ser. No. 09/15 1,471 entitled "METHOD FOR INTERFACING SCANNED PRODUCT INFORMATION WITH A SOURCE FOR THE PRODUCT OVER A GLOBAL NETWORK" filed on Sep. 11, 1998, now abandoned, and U.S. patent application Ser. No. 09/151,530 entitled "METHOD FOR CONTROLLING A COMPUTER WITH AN AUDIO SIGNAL" filed on Sep. 11, 1998, and which issued on Aug. 1, 2000 as U.S. Pat. No. 6,098,106; the present application being related to the following U.S. patent applications: Ser. No. 09/378,219 entitled "INTERACTIVE DOLL," filed on Aug. 19, 1999, which issued on Sep. 30, 2003 as U.S. Pat. No. 6,629,133; Ser. No. 09/378,222 entitled "METHOD AND APPARATUS FOR EMBEDDING ROUTING INFORMATION TO A REMOTE WEB SITE IN AN AUDIO/VIDEO TRACK," filed on Aug. 19, 1999, which issued on Nov. 29, 2005 as U.S. Pat. No. 6,970,914; Ser. No. 09/378,220 entitled "METHOD AND APPARATUS FOR CONTROLLING A COMPUTER FROM A REMOTE LOCATION," filed on Aug. 19, 1999, which issued on Feb. 25, 2003 as U.S. Pat. No. 6,526,449; Ser. No. 09/378,216 entitled "A METHOD FOR CONTROLLING A COMPUTER USING AN EMBEDDED UNIQUE CODE IN THE CONTENT OF VIDEO TAPE MEDIA," filed on Aug. 19, 1999, which issued on Nov. 4, 2003 as U.S. pat. No. 6,643,692; Ser. No. 09/378,218 entitled "A METHOD FOR CONTROLLING A COMPUTER USING AN EMBEDDED UNIQUE CODE IN THE CONTENT OF DVD MEDIA," filed on Aug. 19, 1999, which issued on Mar. 7, 2006 as U.S. Pat. No. 7,010,577; Ser. No. 09/378,217 entitled "A METHOD FOR CONTROLLING A COMPUTER USING AN EMBEDDED UNIQUE CODE IN THE CONTENT OF CD MEDIA," filed on Aug. 19, 1999, which issued on May 9, 2006 as U.S. Pat. No. 7,043,536; Ser. No. 09/378,215 entitled "A METHOD FOR CONTROLLING A COMPUTER USING AN EMBEDDED UNIQUE CODE IN THE CONTENT OF DATA MEDIA," filed on Aug. 19, 1999, which issued on Aug. 1, 2000 as U.S. Pat. No. 6,096,893; the current application being related to the following U.S. patent applications filed Aug. 24, 1999: Ser. No. 09/382,427 entitled "METHOD AND APPARATUS FOR OPENING AND LAUNCHING A WEB BROWSER IN RESPONSE TO AN AUDIBLE SIGNAL," which issued on Dec. 7, 2004 as U.S. Pat. No. 6,829,650; pending Ser. No. 09/382,426 entitled "METHOD AND APPARATUS FOR COMPLETING, SECURING AND CONDUCTING AN E-COMMERCE TRANSACTION;" Ser. No. 09/382,424 entitled "METHOD AND APPARATUS FOR TRACKING USER PROFILE AND HABITS ON A GLOBAL NETWORK," issued on Dec. 28, 2004 as U.S. Pat. No. 6,836,799; Ser. No. 09/382,425 entitled "METHOD AND APPARATUS FOR DIRECTING AN EXISTING PRODUCT CODE TO A REMOTE LOCATION," issued on Jun. 5, 2007 as U.S. Pat. No. 7,228,282; Ser. No. 09/382,373 entitled "METHOD AND APPARATUS FOR LAUNCHING A WEB SITE WITH A NON-STANDARD CONTROL INPUT DEVICE," issued on Oct. 3, 2006 as U.S. Pat. No. 7,117,240; pending Ser. No. 09/382,374 entitled "METHOD AND APPARATUS FOR ALLOWING A BROADCAST TO REMOTELY CONTROL A COMPUTER;" Ser. No. 09/382,371 entitled "METHOD AND APPARATUS FOR LAUNCHING A WEB SITE IN RESPONSE TO SCANNING OF A PRODUCT CODE," issued on Oct. 21, 2008 as U.S. Pat. No. 7,440,993; pending Ser. No. 09/382,423 entitled "METHOD AND APPARATUS FOR UTILIZING AN AUDIBLE SIGNAL TO INDUCE A USER TO SELECT AN E-COMMERCE FUNCTION;" Ser. No. 09/382,421 entitled "A COMBINED PRODUCT CODE AND INSIGNIA FOR SIGNIFYING AN INTERNAL INTERACTIVE CODE," issued on Sep. 9, 2008 as U.S. Pat. No. 7,424,521; Ser. No. 09/382,420 entitled "DIGITAL ID FOR SELECTING WEB BROWSER AND USE PREFERENCES OF A USER DURING USE OF A WEB APPLICATION," issued on Nov. 30, 2004 as U.S. Pat. No. 6,826,592; Ser. No. 09/382,422 entitled "UNIQUE ID FOR IDENTIFYING A USER AND FACILITATING AN E-COMMERCE TRANSACTION," now abandoned; pending Ser. No. 09/382,377 entitled "METHOD AND APPARATUS FOR LINKING A WEB BROWSER TO A PROMOTIONAL OFFER OVER A GLOBAL NETWORK;" Ser. No. 09/382,376 entitled "METHOD AND APPARATUS FOR CONTROLLING A USER'S PC THROUGH AN AUDIO/VISUAL BROADCAST TO ARCHIVE INFORMATION IN THE USER'S PC," issued on Feb. 24, 2004 as U.S. Pat. No. 6,697,949; Ser. No. 09/382,375 entitled "METHOD AND APPARATUS FOR UTILIZING AN EXISTING PRODUCT CODE TO ISSUE A MATCH TO A PREDETERMINED LOCATION ON A GLOBAL NETWORK," issued on Jan. 2, 2007 as U.S. Pat. No. 7,159,037; Ser. No. 09/379,699 entitled "NETWORK ROUTING UTILIZING A PRODUCT CODE," issued on Jan. 22, 2008 as U.S. Pat. No. 7,321,941; and Ser. No. 09/379,700 entitled "METHOD FOR INTERCONNECTING TWO LOCATIONS OVER A NETWORK IN RESPONSE TO USING A TOOL," issued on Mar. 2, 2004 as U.S. Pat. No. 6,701,354.

TECHNICAL FIELD OF THE INVENTION

The present invention is related to a method of computer control and, more particularly, to a system for matching a user's use profile in commerce with a broadcast.

BACKGROUND OF THE INVENTION

With the growing numbers of computer users connecting to the "Internet," many companies are seeking the substantial commercial opportunities presented by such a large user base. For example, one technology which exists allows a television ("TV") signal to trigger a computer response in which the consumer will be guided to a personalized web page. The source of the triggering signal may be a TV, video tape recorder, or radio. For example, if a viewer is watching a TV program in which an advertiser offers viewer voting, the advertiser may transmit a unique signal within the television signal which controls a program known as a "browser" on the viewer's computer to automatically display the advertiser's web page. The viewer then simply makes a selection which is then transmitted back to the advertiser.

In order to provide the viewer with the capability of responding to a wide variety of companies using this technology, a database of company information and Uniform Resource Locator ("URL") codes is necessarily maintained in the viewer's computer, requiring continuous updates. URLs are short strings of data that identify resources on the Internet: documents, images, downloadable files, services, electronic mailboxes, and other resources. URLs make resources available under a variety of naming schemes and access methods such as HTTP, FTP, and Internet mail, addressable in the same simple way. URLs reduce the tedium of "login to this server, then issue this magic command . . . " down to a single click. The Internet uses URLs to specify the location of files on other servers. A URL includes the type of resource being accessed (e.g., Web, gopher, FTP), the address of the server, and the location of the file. The URL can point to any file on any networked computer. Current technology requires the viewer to perform periodic updates to obtain the most current URL database. This aspect of the current technology is cumbersome since the update process requires downloading information to the viewer's computer. Moreover, the likelihood for error in performing the update, and the necessity of redoing the update in the event of a later computer crash, further complicates the process. Additionally, current technologies are limited in the number of companies which may be stored in the database. This is a significant limitation since world-wide access presented by the Internet and the increasing number of companies connecting to perform on-line E-commerce necessitates a large database.

SUMMARY OF THE INVENTION

The present invention disclosed and claimed herein comprises a method for advertising over a network and broadcast media combination. A user's computer at a location on the network is operable to receive a signal from a broadcast generated by an advertiser, which signal has embedded therein unique coded information. The user's computer is connected to an advertiser's location in response to extracting a representation of the audio signal including at least the unique coded information. The advertiser's location is correlated to the unique coded information. The operation of connecting causes profile information of the user to be sent to the advertiser's location over the network. The profile at the advertiser's location is then received, and information generated to forward to the user based upon the user's profile forwarded thereto. This information is then forward to the connected user.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a block diagram of the preferred embodiment;

FIG. 2 illustrates the computer components employed in this embodiment;

FIG. 3 illustrates system interactions over a global network;

FIG. 5 is a flowchart depicting operation of the system according to the preferred embodiment.

FIG. 10 illustrates a more detailed, simplified block diagram of the embodiment of FIG. 9;

FIG. 11 illustrates a diagrammatic view of a method for performing the routing operation;

FIG. 12 illustrates a block diagram of an alternate embodiment utilizing an optical region in the video image for generating the routing information;

FIG. 13 illustrates a block diagram illustrating the generation of a profile with the disclosed embodiment;

FIG. 16 illustrates a general block diagram of a disclosed embodiment;

FIG. 16a illustrates a flowchart depicting the operation wherein the input device is registered;

FIG. 17 illustrates the conversion circuit of the wedge interface;

FIG. 18 illustrates a sample message packet transmitted from the user PC to the ARS;

DETAILED DESCRIPTION OF THE INVENTION

Figure 4A:
FIGS. 4a-4e illustrate the various message packets transmitted between the source PC and network servers used in the preferred embodiment.

Referring now to FIG. 1, there is illustrated a block diagram of a system for controlling a personal computer ("PC") 112 via an audio tone transmitted over a wireless system utilizing a TV. In the embodiment illustrated in FIG. 1, there is provided a transmission station 101 and a receive station 117 that are connected via a communication link 108. The transmission station 101 is comprised of a television program source 104, which is operable to generate a program in the form of a broadcast signal comprised of video and audio. This is transmitted via conventional techniques along channels in the appropriate frequencies. The program source is input to a mixing device 106, which mixing device is operable to mix in an audio signal. This audio signal is derived from an audio source 100 which comprises a coded audio signal which is then modulated onto a carrier which is combined with the television program source 104. This signal combining can be done at the audio level, or it can even be done at the RF level in the form of a different carrier. However, the preferred method is to merely sum the audio signal from the modulator 102 into the audio channel of the program that is generated by the television program source 104. The output thereof is provided from the mixing device 106 in the form of broadcast signal to an antenna 107, which transmits the information over the communication link 108 to an antenna 109 on the receive side.

On the receive side of the system, a conventional receiver 110, such as a television is provided. This television provides a speaker output which provides the user with an audible signal. This is typically associated with the program. However, the receiver 110 in the disclosed embodiment, also provides an audio output jack, this being the type RCA jack. This jack is utilized to provide an audio output signal on a line 113 which is represented by an audio signal 111. This line 113 provides all of the audio that is received over the communication link 108 to the PC 112 in the audio input port on the PC 112. However, it should be understood that, although a direct connection is illustrated from the receiver 110 to the PC 112, there actually could be a microphone pickup at the PC 112 which could pick the audio signal up. In the disclosed embodiment the audio signal generated by the advertiser data input device 100 is audible to the human ear and, therefore, can be heard by the user. Therefore, no special filters are needed to provide this audio to the PC 112.

The PC 112 is operable to run programs thereon which typically are stored in a program file area 116. These programs can be any type of programs such as word processing programs, application programs, etc. In the disclosed embodiment, the program that is utilized in the system is what is referred to as a "browser." The PC 112 runs a browser program to facilitate the access of information on the network, for example, a global communication network known as the "Internet" or the World-Wide-Web ("Web"). The browser is a hypertext-linked application used for accessing information. Hypertext is a term used to describe a particular organization of information within a data processing system, and its presentation to a user. It exploits the computer's ability to link together information from a wide variety of sources to provide the user with the ability to explore a particular topic. The traditional style of presentation used in books employs an organization of the information which is imposed upon it by limitations of the medium, namely fixed sized, sequential paper pages. Hypertext systems, however, use a large number of units of text or other types of data such as image information, graphical information, video information, or sound information, which can vary in size. A collection of such units of information is termed a hypertext document, or where the hypertext documents employ information other than text, hypermedia documents. Multimedia communications may use the Hypertext Transfer Protocol ("HTTP"), and files or formatted data may use the Hypertext Markup Language ("HTML"). This formatting language provides for a mingling of text, graphics, sound, video, and hypertext links by "tagging" a text document using HTML. Data encoded using HTML is often referred to as an "HTML document," an "HTML page," or a "home page." These documents and other Internet resources may be accessed across the network by means of a network addressing scheme which uses a locator referred to as a Uniform Resource Locator ("URL"), for example, "http://www.digital.com."

The Internet is one of the most utilized networks for interconnecting distributed computer systems and allows users of these computer systems to exchange data all over the world. Connected to the Internet are many private networks, for example, corporate or commercial networks. Standard protocols, such as the Transport Control Protocol ("TCP") and the Internet Protocol ("IP") provide a convenient method for communicating across these diverse networks. These protocols dictate how data are formatted and communicated. As a characteristic of the Internet, the protocols are layered in an IP stack. At higher levels of the IP stack, such as the application layer (where HTTP is employed), the user information is more readily visible, while at lower levels, such as the network level (where TCP/IP are used), the data can merely be observed as packets or a stream of rapidly moving digital signals. Superimposed on the Internet is a standard protocol interface for accessing Web resources, such servers, files, Web pages, mail messages, and the like. One way that Web resources can be accessed is by browsers made by Netscape® and Microsoft Internet Explorer®.

Referring again now to FIG. 1, the user can load this program with the appropriate keystrokes such that a browser window will be displayed on a display 118. In one embodiment, the user can run the browser program on the PC 112 such that the browser window is displayed on the display 118. While watching a preferred program, the user can also view display 118. When an audio signal is received by the receiver 110 and the encoded information is contained therein that was input thereto by the advertiser, the PC 112 will then perform a number of operations. The first operation, according to the disclosed embodiment, is to extract the audio information within the received audio signal in the form of digital data, and then transmit this digital data to a defined location on the global communication network via a modem connection 114. This connection will be described hereinbelow. This information will be relayed to a proprietary location and the instructions sent back to the PC 112 as to the location of the advertiser associated with the code, and the PC 112 will then effect a communication link to that location such that the user can view on the display 118 information that the advertiser, by the fact of putting the tone onto the broadcast channel, desires the viewer to view. This information can be in the form of interactive programs, data files, etc. In one example, when an advertisement appears on the television, the tone can be generated and then additional data displayed on the display 118. Additionally, a streaming video program could be played on the PC received over the network, which streaming video program is actually longer than the advertising segment on the broadcast. Another example would be a sports game that would broadcast the tone in order to allow a user access to information that is not available over the broadcast network, such as additional statistics associated with the sports program, etc.

By utilizing the system described herein with respect to the disclosed embodiment of FIG. 1, an advertiser is allowed the ability to control a user's PC 112 through the use of tones embedded within a program audio signal. As will be described hereinbelow, the disclosed embodiment utilizes particular routing information stored in the PC 112 which allows the encoded information in the received audio signal to route this information to a desired location on the network and then allow other routing information to be returned to the PC 112 for control thereof to route the PC 112 to the appropriate location associated with that code.

Referring now to FIG. 2, there is illustrated a computer 204, similar to computer 112, connected to display information on display 118. The computer 204 comprises an internal audio or "sound" card 206 for receiving the transmitted audio signal through receive antenna 109 and receiver 110. The sound card 206 typically contains analog-to-digital circuitry for converting the analog audio signal into a digital signal. The digital signal may then be more easily manipulated by software programs. The receiver 110 separates the audio signal from the video signal. A special trigger signal located within the transmitted advertiser audio signal triggers proprietary software running on the computer 204 which launches a communication application, in this particular embodiment, the web browser application located on the PC 204. Coded advertiser information contained within the audio signal is then extracted and appended with the address of a proprietary server located on the communication network. The remote server address is in the form of a URL. This appended data, in addition to other control codes, is inserted directly into the web browser application for automatic routing to the communication network.

The web browser running on PC 204, and communicating to the network with a through an internal modem 208, in this embodiment, transmits the advertiser information to the remote server. The remote server cross-references the advertiser product information to the address of the advertiser server located on the network. The address of the advertiser server is routed back through the PC 204 web browser to the advertiser server. The advertiser product information is returned to PC 204 to be presented to the viewer on display 118. In this particular embodiment, the particular advertiser product information displayed is contained within the advertiser's web page 212. As mentioned above, the audio signal is audible to the human ear. Therefore the audio signal, as emitted from the TV speakers, may be input to the sound card 206 via a microphone. Furthermore, the audio signal need not be a real-time broadcast, but may be on video tapes, CDs, DVD, or other media which may be displayed at a later date. With the imminent implementation of high definition digital television, the audio signal output from the TV may also be digital. Therefore, direct input into a sound card for A/D purposes may not be necessary, but alternative interfacing techniques to accommodate digital-to-digital signal formats would apply.

Referring now to FIG. 3, there is illustrated a source PC 302, similar to PCs 204 and 112, connected to a global communication network 306 through an interface 304. In this embodiment, the audio signal 111 is received by PC 302 through its sound card 206. The audio signal 111 comprises a trigger signal which triggers proprietary software into launching a web browser application residing on the PC 302. The audio signal 111 also comprises advertiser product information which is extracted and appended with URL information of an Advertiser Reference Server ("ARS") 308. The ARS 308 is a system disposed on the network that is defined as the location to which data in the audio signal 111 is to be routed. As such, data in the audio signal 111 will always be routed to the ARS 308, since a URL is unique on the network system. Connected to the ARS 308 is a database 310 of product codes and associated manufacturer URLs. The database 310 undergoes a continual update process which is transparent to the user. As companies sign-on, e.g., subscribe, to this technology, manufacturer and product information is added to the database 310 without interrupting operation of the source PC 302 with frequent updates. When the advertiser server address URL is obtained from the ARS database 310, it and the request for the particular advertiser product information is automatically routed back through the web browser on PC 302, over to the respective advertiser server for retrieval of the advertiser product information to the PC 302. It should be noted that although the disclosed invention discusses a global communication network, the system is also applicable to LANs, WANs, and peer-to-peer network configurations. It should be noted that the disclosed architecture is not limited to a single source PC 302, but may comprise a plurality of source PCs, e.g., PC 300 and PC 303. Moreover, a plurality of ARS 308 systems and advertiser servers 312 may be implemented, e.g., ARS 314, and advertiser server A 316, respectively.

The information transactions, in general, which occur between the networked systems of this embodiment, over the communication network, are the following. The web browser running on source PC 302 transmits a message packet to the ARS 308 over Path "A." The ARS 308 decodes the message packet and performs a cross-reference function with product information extracted from the received message packet to obtain the address of an advertiser server 312. A new message packet is assembled comprising the advertiser server 312 address, and sent back to the source PC 302 over Path "B." A "handoff" operation is performed whereby the source PC 302 browser simply reroutes the information on to the advertiser server 312 over Path "C," with the appropriate source and destination address appended. The advertiser server 312 receives and decodes the message packet. The request-for-advertiser-product-information is extracted and the advertiser 312 retrieves the requested information from its database for transmission back to the source PC 302 over Path "D." The source PC 302 then processes the information, i.e., for display to the viewer. The optional Path "E" is discussed hereinbelow. It should be noted that the disclosed methods are not limited to only browser communication applications, but may accommodate, with sufficient modifications by one skilled in the art, other communication applications used to transmit information over the Internet or communication network.

Referring now to FIG. 4a, the message packet 400 sent from the source PC 302 to ARS 308 via Path "A" comprises several fields. One field comprises the URL of the ARS 308 which indicates where the message packet is to be sent. Another field comprises the advertiser product code or other information derived from the audio signal 111, and any additional overhead information required for a given transaction. The product code provides a link to the address of the advertiser server 312, located in the database 310. Yet another field comprises the network address of the source PC 302. In general, network transmissions are effected in packets of information, each packet providing a destination address, a source address, and data. These packets vary depending upon the network transmission protocol utilized for communication. Although the protocols utilized in the disclosed embodiment are of a conventional protocol suite commonly known as TCP/IP, it should be understood that any protocols providing the similar basic functions can be used, with the primary requirement that a browser can forward the routing information to the desired URL in response to keystrokes being input to a PC. However, it should be understood that any protocol can be used, with the primary requirement that a browser can forward the product information to the desired URL in response to keystrokes being input to a PC. Within the context of this disclosure, "message packet" shall refer to and comprise the destination URL, product information, and source address, even though more than a single packet must be transmitted to effect such a transmission.

Figure 4B:
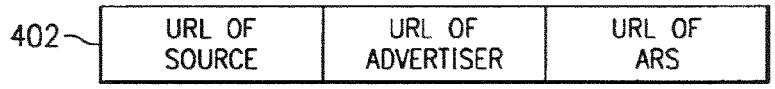

Upon receipt of the message packet 400 from source PC 302, ARS 308 processes the information in accordance with instructions embedded in the overhead information. The ARS 308 specifically will extract the product code information from the received packet 400 and, once extracted, will then decode this product code information. Once decoded, this information is then compared with data contained within the ARS advertiser database 310 to determine if there is a "hit." If there is no "hit" indicating a match, then information is returned to the browser indicating such. If there is a "hit," a packet 402 is assembled which comprises the address of the source PC 302, and information instructing the source PC 302 as to how to access, directly in a "handoff" operation, another location on the network, that of an advertiser server 312. This type of construction is relatively conventional with browsers such as Netscape® and Microsoft Internet Explorer® and, rather than displaying information from the ARS 308, the source PC 302 can then access the advertiser server 312. The ARS 308 transmits the packet 402 back to source PC 302 over Path "B." Referring now to FIG. 4b, the message packet 402 comprises the address of the source PC 302, the URL of the advertiser server 312 embedded within instructional code, and the URL of the ARS 308.

Figure 4C:
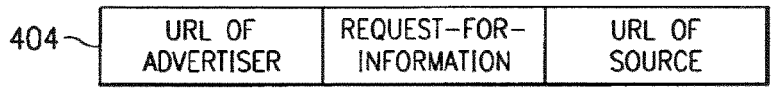

Upon receipt of the message packet 402 by the source PC 302, the message packet 402 is disassembled to obtain pertinent routing information for assembly of a new message packet 404. The web browser running on source PC 302 is now directed to obtain, over Path "C," the product information relevant to the particular advertiser server 312 location information embedded in message packet 404. Referring now to FIG. 4c, the message packet 404 for this transaction comprises the URL of the advertiser server 312, the request-for-product-information data, and the address of the source PC 302.

Figure 4D:
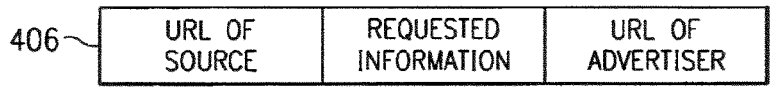

Upon receipt of the message packet 404 from source PC 302, advertiser server 312 disassembles the message packet 404 to obtain the request-for-product-information data. The advertiser server 312 then retrieves the particular product information from its database, and transmits it over Path "D" back to the source PC 302. Referring now to FIG. 4d, the message packet 406 for this particular transaction comprises the address of the source PC 302, the requested information, and the URL of the advertiser server 312.

Figure 4E:
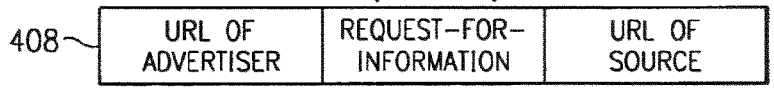

Optionally, the ARS 308 may make a direct request for product information over Path "E" to advertiser server 312. In this mode, the ARS 308 sends information to the advertiser server 312 instructing it to contact the source PC 302. This, however, is unconventional and requires more complex software control. The message packet 408 for this transaction is illustrated in FIG. 4e, which comprises the URL of the advertiser server 312, the request-for-product-information data, and the address of the source PC 302. Since product information is not being returned to the ARS 308, but directly to the source PC 302, the message packet 408 requires the return address to be that of the source PC 302. The product information is then passed directly to PC 302 over Path "D."

Referring now to FIG. 5, the method for detecting and obtaining product information is as follows. In decision block 500, a proprietary application running resident on a source computer PC 302 (similar to PC 204) monitors the audio input for a special trigger signal. Upon detection of the trigger signal, data following the trigger signal is decoded for further processing, in function block 502. In function block 504, the data is buffered for further manipulation. In decision block 506, a determination is made as to whether the data can be properly authenticated. If not, program flow continues through the "N" signal to function block 520 where the data is discarded. In function block 522, the program then signals for a retransmission of the data. The system then waits for the next trigger signal, in decision block 500. If properly authenticated in decision block 506, program flow continues through the "Y" signal path where the data is then used to launch the web browser application, as indicated in function block 508. In function block 510, the web browser receives the URL data, which is then automatically routed through the computer modem 208 to the network interface 304 and ultimately to the network 306. In function block 514, the ARS 308 responds by returning the URL of advertiser server 312 to the PC 302. In function block 516, the web browser running on the source PC 302, receives the advertiser URL information from the ARS 308, and transmits the URL for the product file to the advertiser server 312. In block 518, the advertiser server 312 responds by sending the product information to the source PC 302 for processing.

The user may obtain the benefits of this architecture by simply downloading the proprietary software over the network. Other methods for obtaining the software are well-known; for example, by CD, diskette, or pre-loaded hard drives.

Figure 6:
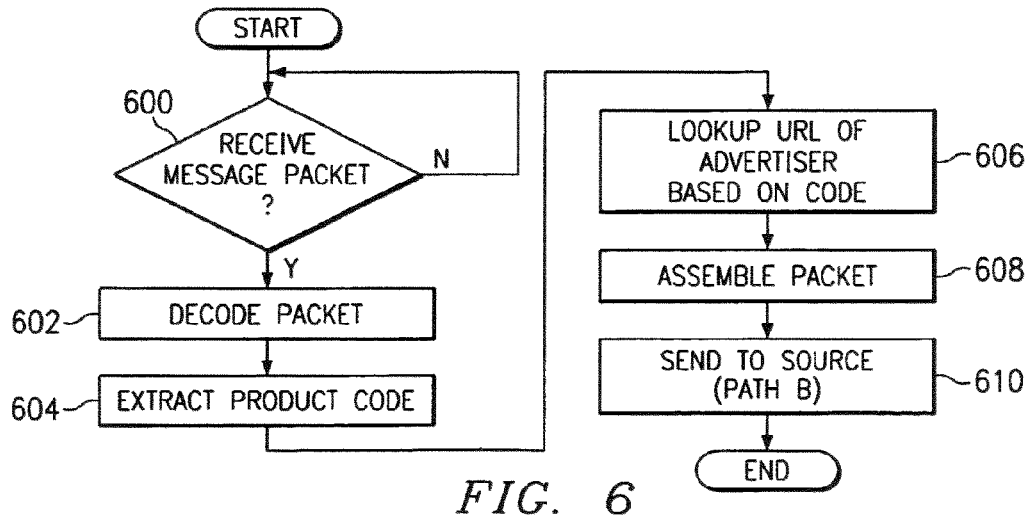
FIG. 6 illustrates a flowchart of actions taken by the Advertiser Reference Server ("ARS") server.

Referring now to FIG. 6, there is illustrated a flowchart of the process the ARS 308 may undergo when receiving the message packet 400 from the source PC 302. In decision block 600, the ARS 308 checks for the receipt of the message packet 400. If a message packet 400 is not received, program flow moves along the "N" path to continue waiting for the message. If the message packet 400 is received, program flow continues along path "Y" for message processing. Upon receipt of the message packet 400, in function block 602, the ARS 308 decodes the message packet 400. The product code is then extracted independently in function block 604 in preparation for matching the product code with the appropriate advertiser server address located in the database 310. In function block 606, the product code is then used with a lookup table to retrieve the advertiser server 312 URL of the respective product information contained in the audio signal data. In function block 608, the ARS 308 then assembles message packet 402 for transmission back to the source PC 302. Function block 610 indicates the process of sending the message packet 402 back to the source PC 302 over Path "B."

Figure 7:
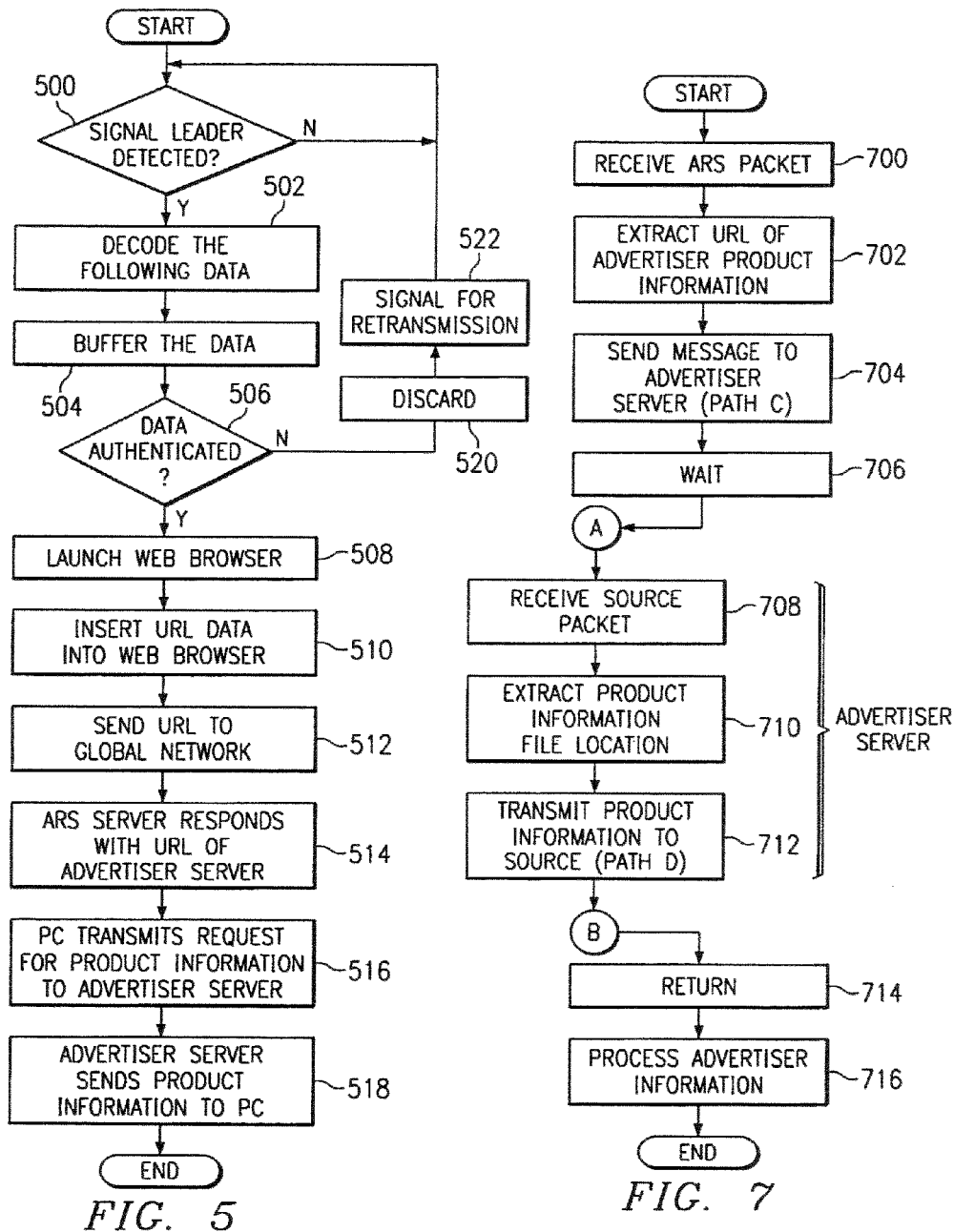
FIG. 7 illustrates a flowchart of the interactive process between the source computer and ARS.

Referring now to FIG. 7, there is illustrated a flowchart of the interactive processes between the source PC 302 and the advertiser server 312. In function block 700, the source PC 302 receives the message packet 402 back from the ARS 308 and begins to decode the packet 402. In function block 702, the URL of the advertiser product information is extracted from the message packet 402 and saved for insertion into the message packet 404 to the advertiser server 312. The message packet 404 is then assembled and sent by the source PC 302 over Path "C" to the advertiser server 312, n function block 704. While the source PC 302 waits, in function block 706, the advertiser server 312 receives the message packet 404 from the source PC 302, in function block 708, and disassembles it. The product information location is then extracted from the message packet 404 in function block 710. The particular product information is retrieved from the advertiser server 312 database for transmission back to the source PC 302. In function block 712, the product information is assembled into message packet 406 and then transmitted back to the source PC 302 over Path "D." Returning to the source PC 302 in function block 714, the advertiser product information contained in the message packet 406 received from the advertiser server 312, is then extracted and processed in function block 716.

Figure 8:
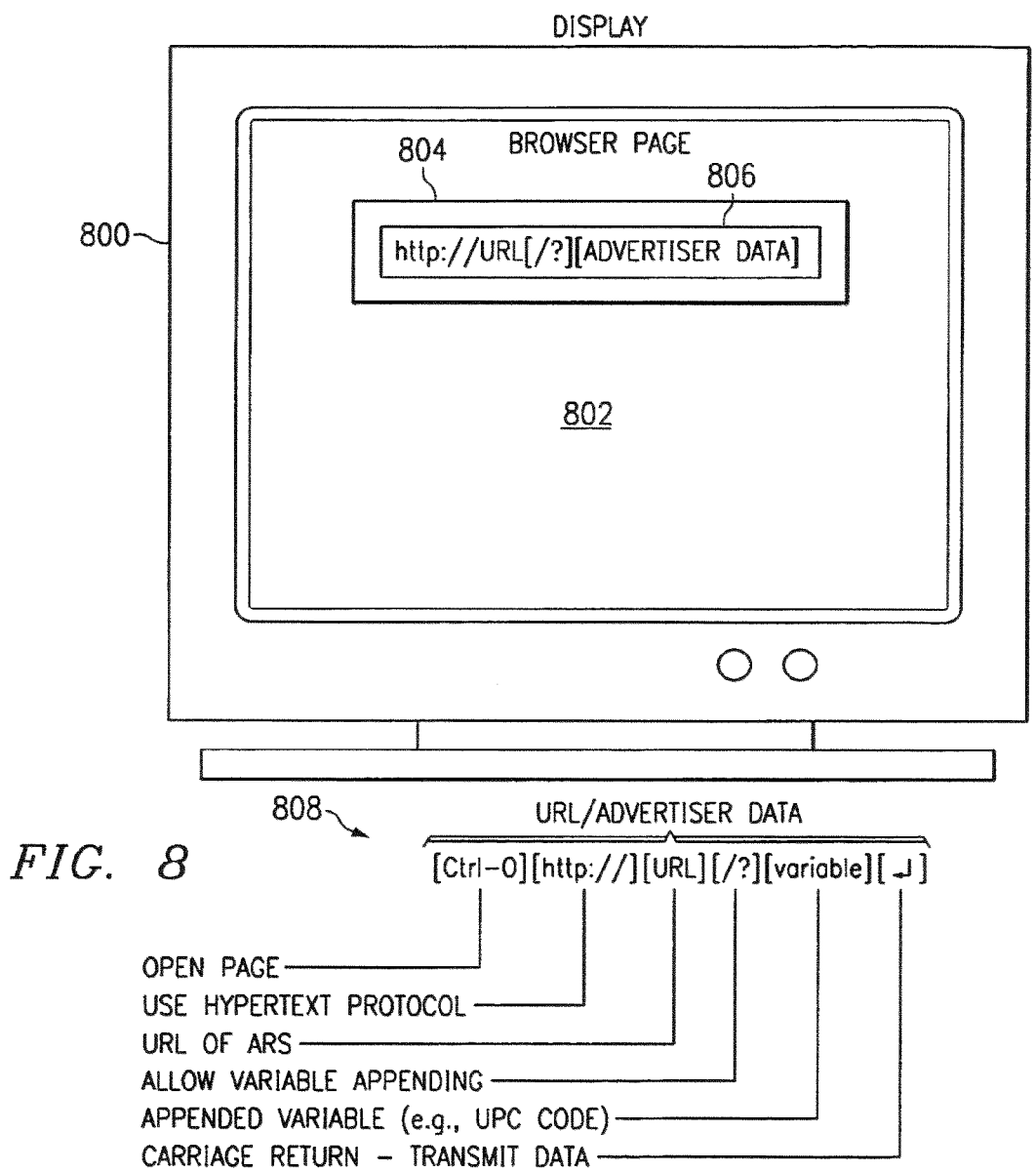
FIG. 8 illustrates a web browser page receiving the modified URL/advertiser product data according to the preferred embodiment.

Referring now to FIG. 8, after receipt of a trigger signal, a web browser application on a source PC 302 is automatically launched and computer display 800 presents a browser page 802. Proprietary software running on the source PC 302 processes the audio signal data after being digitized through the sound card 206. The software appropriately prepares the data for insertion directly into the web browser by extracting the product information code and appending keystroke data to this information. First, a URL page 804 is opened in response to a Ctrl-O command added by the proprietary software as the first character string. Opening URL page 804 automatically positions the cursor in a field 806 where additional keystroke data following the Ctrl-O command will be inserted. After URL page 804 is opened, the hypertext protocol preamble http:// is inserted into the field 806. Next, URL information associated with the location of the ARS 308 is inserted into field 806. Following the ARS 308 URL data are the characters /? to allow entry of variables immediately following the /? characters. In this embodiment, the variable following is the product information code received in the audio signal. The product code information also provides the cross-reference information for obtaining the advertiser URL from the ARS database 310. Next, a carriage return is added to send the URL/product data and close the window 804. After the message packet 400 is transmitted to the ARS 308 from the source PC 302, transactions from the ARS 308, to the source PC 302, to the advertiser server 312, and back to the source PC 302, occur quickly and are transparent to the viewer. At this point, the next information the viewer sees is the product information which was received from the advertiser server 312.

Figure 9:
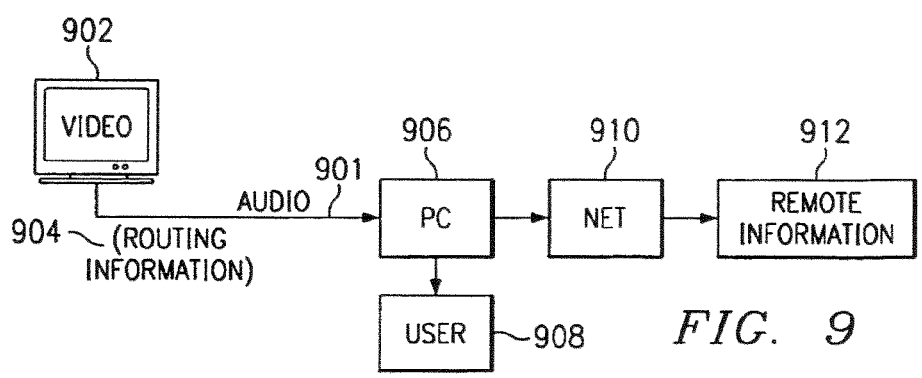
FIG. 9 illustrates a simplified block diagram of the disclosed embodiment.

Referring now to FIG. 9, there is illustrated a block diagram of a more simplified embodiment. In this embodiment, a video source 902 is provided which is operable to provide an audio output on an audio cable 901 which provides routing information referred to by reference numeral 904. The routing information 904 is basically information contained within the audio signal. This is an encoded or embedded signal. The important aspect of the routing information 904 is that it is automatically output in realtime as a function of the broadcast of the video program received over the video source 902. Therefore, whenever the program is being broadcast in realtime to the user 908, the routing information 904 will be output whenever the producer of the video desires it to be produced. It should be understood that the box 902 representing the video source could be any type of media that will result in the routing information being output. This could be a cassette player, a DVD player, an audio cassette, a CD ROM or any such media. It is only important that this is a program that the producer develops which the user 908 watches in a continuous or a streaming manner. Embedded within that program, at a desired point selected by the producer, the routing information 904 is output.

The audio information is then routed to a PC 906, which is similar to the PC 112 in FIG. 1. A user 908 is interfaced with the PC to receive information thereof, the PC 906 having associated therewith a display (not shown). The PC 906 is interfaced with a network 910, similar to the network 306 in FIG. 3. This network 910 has multiple nodes thereon, one of which is the PC 906, and another of which is represented by a network node 912 which represents remote information. The object of the present embodiment is to access remote information for display to the user 908 by the act of transmitting from the video program in block 902 the routing information 904. This routing information 904 is utilized to allow the PC 906 which has a network "browser" running thereon to "fetch" the remote information at the node 912 over the network 910 for display to the user 908. This routing information 904 is in the form of an embedded code within the audio signal, as was described hereinabove.

Referring now to FIG. 10, there is illustrated a more detailed block diagram of the embodiment of FIG. 9. In this embodiment, the PC 906 is split up into a couple of nodes, a first PC 1002 and a second PC 1004. The PC 1002 resides at the node associated with the user 908, and the PC 1004 resides at another node. The PC 1004 represents the ARS 308 of FIG. 3. The PC 1004 has a database 1006 associated therewith, which is basically the advertiser database 310. Therefore, there are three nodes on the network 910 necessary to implement the disclosed embodiment, the PC 1002, the PC 1004 and the remote information node 912. The routing information 904 is utilized by the PC 1002 for routing to the PC 1004 to determine the location of the remote information node 912 on the network 910. This is returned to the PC 1002 and a connection made directly with the remote information node 912 and the information retrieved therefrom to the user 908. The routing information 904 basically constitutes primary routing information.

Referring now to FIG. 11, there is illustrated a diagrammatic view of how the network packet is formed for sending the primary routing information to the PC 1004. In general, the primary routing information occupies a single field which primary routing information is then assembled into a data packet with the secondary routing information for transfer to the network 910. This is described hereinabove in detail.

Referring now to FIG. 12, there is illustrated an alternate embodiment to that of FIG. 9. In this embodiment, the video source 902 has associated therewith an optical region 1202, which optical region 1202 has disposed therein an embedded video code. This embedded video code could be relatively complex or as simple as a grid of dark and white regions, each region in the grid able to have a dark color for a logic "1" or a white region for a logic "0." This will allow a digital value to be disposed within the optical region 1202. A sensor 1204 can then be provided for sensing this video code. In the example above, this would merely require an array of optical detectors, one for each region in the grid to determine whether this is a logic "1" or a logic "0" state. One of the sensed video is then output to the PC 906 for processing thereof to determine the information contained therein, which information contained therein constitutes the primary routing information 904. Thereafter, it is processed as described hereinabove with reference to FIG. 9.

Referring now to FIG. 13, there is illustrated a block diagram for an embodiment wherein a user's profile can be forwarded to the original subscriber or manufacturer. The PC 906 has associated therewith a profile database 1302, which profile database 1302 is operable to store a profile of the user 908. This profile is created when the program, after initial installation, requests profile information to be input in order to activate the program. In addition to the profile, there is also a unique ID that is provided to the user 908 in association with the browser program that runs on the PC 906. This is stored in a storage location represented by a block 1304. This ID 1304 is accessible by a remote location as a "cookie" which is information that is stored in the PC 906 in an accessible location, which accessible location is actually accessible by the remote program running on a remote node.

The ARS 308, which basically constitutes the PC 1004 of FIG. 10, is operable to have associated therewith a profile database 1308, which profile database 1308 is operable to store profiles for all of the users. The profile database 1308 is a combination of the stored in profile database 1302 for all of the PCs 906 that are attachable to the system. This is to be distinguished from information stored in the database 310, the advertiser's database, which contains intermediate destination tables. When the routing information in the primary routing information 904 is forwarded to the ARS 308 and extracted from the original data packet, the lookup procedure described hereinabove can then be performed to determine where this information is to be routed. The profile database 1302 is then utilized for each transaction, wherein each transaction in the form of the routing information received from the primary routing information 904 is compared to the destination tables 310 to determine what manufacturer it is associated with.

The associated ID 1304 that is transmitted along with the routing information in primary routing information 904 is then compared with the profile database 1308 to determine if a profile associated therewith is available. This information is stored in a transaction database 1310 such that, at a later time, for each routing code received in the form of the information in primary routing information 904, there will associated therewith the IDs 1304 of each of the PCs 906. The associated profiles in database 1308, which are stored in association with IDs 1304, can then be assembled and transmitted to a subscriber as referenced by a subscriber node 1312 on the network 910. The ARS 308 can do this in two modes, a realtime mode or a non-realtime mode. In a realtime mode, each time a PC 906 accesses the advertiser database 310, that user's profile information is uploaded to the subscriber node 1312. At the same time, billing information is generated for that subscriber 1312 which is stored in a billing database 1316. Therefore, the ARS 308 has the ability to inform the subscriber 1312 of each transaction, bill for those transactions, and also provide to the subscriber 1312 profile information regarding who is accessing the particular product advertisement having associated therewith the routing information field 904 for a particular routing code as described hereinabove. This information, once assembled, can then be transmitted to the subscriber 1312 and also be reflected in billing information and stored in the billing information database 1316.

Figure 14:
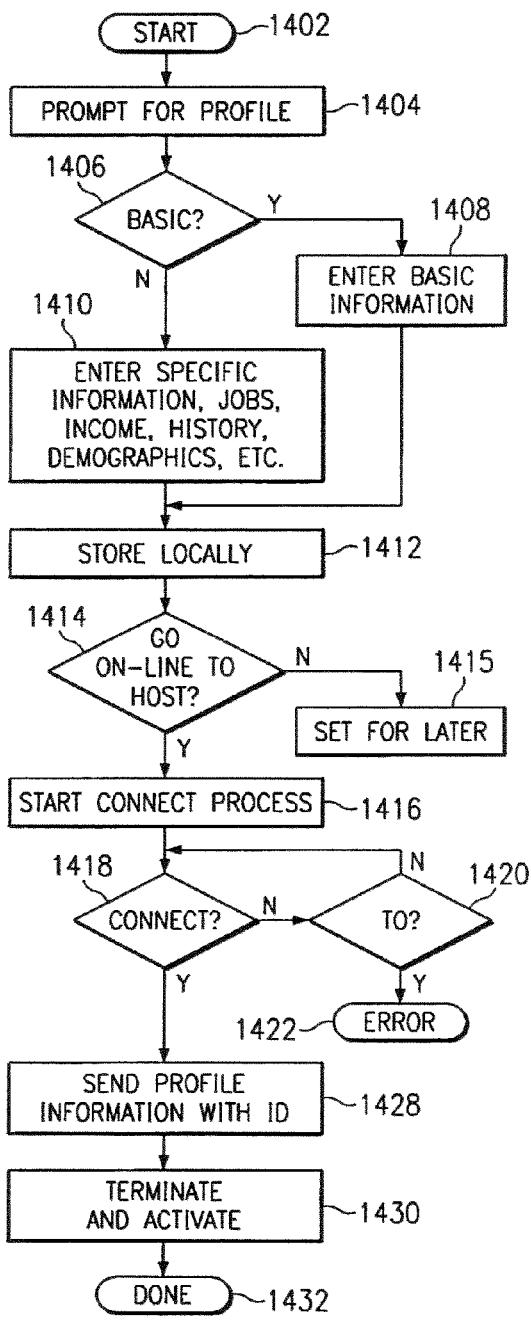
FIG. 14 illustrates a flowchart for generating the profile and storing at the ARS.

Referring now to FIG. 14, there is illustrated a flowchart depicting the operation for storing the profile for the user. The program is initiated in a block 1402 and then proceeds to a function block 1404, wherein the system will prompt for the profile upon initiation of the system. This initiation is a function that is set to activate whenever the user initially loads the software that he or she is provided. The purpose for this is to create, in addition to the setup information, a user profile. Once the user is prompted for this, then the program will flow to a decision block 1406 to determine whether the user provides basic or detailed information. This is selectable by the user. If selecting basic, the program will flow to a function block 1408 wherein the user will enter basic information such as name and serial number and possibly an address. However, to provide some incentive to the user to enter more information, the original prompt in function block 1404 would have offers for such things as coupons, discounts, etc, if the user will enter additional information. If the user selects this option, the program flows from the decision block 1406 to a function block 1410. In the function block 1410, the user is prompted to enter specific information such as job, income level, general family history, demographic information and more. There can be any amount of information collected in this particular function block.

Once all of the information is collected, in either the basic mode or the more specific mode, the program will then flow to a function block 1412 where this information is stored locally. The program then flows to a decision block 1414 to then go on-line to the host or the ARS 308. In general, the user is prompted to determine whether he or she wants to send this information to the host at the present time or to send it later. If he or she selects the "later" option, the program will flow to a function block 1415 to prompt the user at a later time to send the information. In the disclosed embodiment, the user will not be able to utilize the software until the profile information is sent to the host. Therefore, the user may have to activate this at a later time in order to connect with the host.

If the user has selected the option to upload the profile information to the host, the program will flow to the function block 1416 to initiate the connect process and then to a decision block 1418 to determine if the connection has been made. If not, the program will flow along a "N" path to a time to decision block 1420 which will time to an error block 1422 or back to the input of the connect decision block 1418. The program, once connected, will then flow along a "Y" path from decision block 1418 to a function block 1428 to send the profile information with the ID of the computer or user to the host. The ID is basically, as described hereinabove, a "cookie" in the computer which is accessed by the program when transmitting to the host. The program will then flow to a function block 1430 to activate the program such that it, at later time, can operate without requiring all of the set up information. In general, all of the operation of this flowchart is performed with a "wizard" which steps the user through the setup process. Once complete, the program will flow to a Done block 1432.

Figure 15:
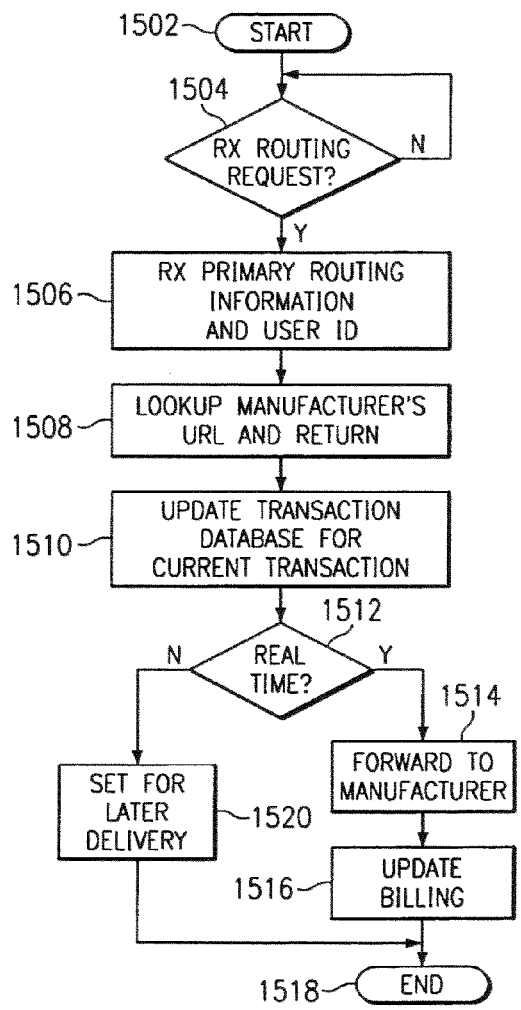
FIG. 15 illustrates a flowchart for processing the profile information when information is routed to a user.

Referring now to FIG. 15, there is illustrated a flowchart depicting the operation of the host when receiving a transaction. The program is initiated at a start block 1502 and then proceeds to decision block 1504, wherein it is determined whether the system has received a routing request, i.e., the routing information 904 in the form of a tone, etc., embedded in the audio signal as described hereinabove with respect to FIG. 9. The program will loop back around to the input of decision block 1504 until the routing request has been received. At this time, the program will flow along the "Y" path to a function block 1506 to receive the primary routing information and the user ID. Essentially, this primary routing information is extracted from the audio tone, in addition to the user ID. The program then flows to a function block 1508 to look up the manufacturer URL that corresponds to the received primary routing information and then return the necessary command information to the originating PC 108 in order to allow that PC to connect to the destination associated with the primary routing information. Thereafter, the program will flow to a function block 1510 to update the transaction database 1310 for the current transaction. In general, the routing information 904 will be stored as a single field with the associated IDs. The profile database, as described hereinabove, has associated therewith detailed profiles of each user on the system that has activated their software in association with their ID. Since the ID was sent in association with the routing information, what is stored in the transaction database is the routing code, in association with all of the IDs transmitted to the system in association with that particular routing code. Once this transaction database has been updated, as described hereinabove, the transactions can be transferred back to the subscriber at node 312 with the detailed profile information from the profile database 1308.

The profile information can be transmitted back to the subscriber or manufacturer in the node 312 in realtime or non-realtime. A decision block 1512 is provided for this, which determines if the delivery is realtime. If realtime, the program will flow along a "Y" path to a function block 1514 wherein the information will be immediately forwarded to the manufacturer or subscriber. The program will then flow to a function block 1516 wherein the billing for that particular manufacturer or subscriber will be updated in the billing database 1316. The program will then flow into an End block 1518. If it was non-realtime, the program moves along the "N" path to a function block 1520 wherein it is set for a later delivery and it is accrued in the transaction database. In any event, the transaction database will accrue all information associated with a particular routing code.

With a realtime transaction, it is possible for a manufacturer to place an ad in a magazine or to place a product on a shelf at a particular time. The manufacturer can thereafter monitor the times when either the ads are or the products are purchased. Of course, they must be scanned into a computer which will provide some delay. However, the manufacturer can gain a very current view of how a product is moving. For example, if a cola manufacturer were to provide a promotional advertisement on, for example, television, indicating that a new cola was going to be placed on the shelf and that the first 1000 purchasers, for example, scanning their code into the network would receive some benefit, such as a chance to win a trip to some famous resort in Florida or some other incentive, the manufacturer would have a very good idea as to how well the advertisement was received. Further, the advertiser would know where the receptive markets were. If this advertiser, for example, had placed the television advertisement in ten cities and received overwhelming response from one city, but very poor response from another city, he would then have some inclination to believe that either one poor response city was not a good market or that the advertising medium he had chosen was very poor. Since the advertiser can obtain a relatively instant response and also content with that response as to the demographics of the responder, very important information can be obtained in a relatively short time.

It should be noted that the disclosed embodiment is not limited to a single source PC 302, but may encompass a large number of source computers connected over a global communication network. Additionally, the embodiment is not limited to a single ARS 308 or a single advertiser server 312, but may include a plurality of ARS and advertiser systems, indicated by the addition of ARS 314 and advertiser server A 316, respectively. It should also be noted that this embodiment is not limited only to global communication networks, but also may be used with LAN, WAN, and peer-to-peer configurations.

It should also be noted that the disclosed embodiment is not limited to a personal computer, but is also applicable to, for example, a Network Computer ("NetPC"), a scaled-down version of the PC, or any system which accommodates user interaction and interfaces to information resources.

One typical application of the above noted technique is for providing a triggering event during a program, such as a sport event. In a first example, this may be generated by an advertiser. One could imagine that, due to the cost of advertisements in a high profile sports program, there is a desire to utilize this time widely. If, for example, an advertiser contracted for 15 seconds worth of advertising time, they could insert within their program a tone containing the routing information. This routing information can then be output to the user's PC which will cause the user's PC to, via the network, obtain information from a remote location typically controlled by the advertiser. This could be in the form of an advertisement of a length longer than that contracted for. Further, this could be an interactive type of advertisement. An important aspect to the type of interaction between the actual broadcast program with the embedded routing information and the manufacturer's site is the fact that there is provided in the information as to the user's PC and a profile of the user themselves. Therefore, an advertiser can actually gain realtime information as to the number of individuals that are watching their particular advertisement and also information as to the background of those individuals, profile information, etc. This can be a very valuable asset to an advertiser.

In another example, the producer of the program, whether it be an on-air program, a program embedded in a video tape, CD-ROM, DVD, or a cassette, can allow the user to automatically access additional information that is not displayed on the screen. For example, in a sporting event, various statistics can be provided to the user from a remote location, merely by the viewer watching the program. When these statistics are provided, the advertiser can be provided with profile information and background information regarding the user. This can be important when, for example, the user may record a sports program. If the manufacturer sees that this program routing code is being output from some device at a later time than the actual broadcast itself, this allows the advertisers to actually see that their program is still being used and also what type of individual is using it. Alternatively, the broadcaster could determine the same and actually bill the advertiser an additional sum for a later broadcast. This is all due to the fact that the routing information automatically, through a PC and a network, will provide an indication to the advertiser for other intermediary regarding the time at which the actual information was broadcast.

The different type of medium that can be utilized with the above embodiment are such things as advertisements, which are discussed hereinabove, contests, games, news programs, education, coupon promotional programs, demonstration media (demos), photographs, all of which can be broadcast on a private site or a public site. This all will provide the ability to allow realtime interface with the network and the remote location for obtaining the routed information and also allow for realtime billing and accounting.

Referring now to FIG. 16, there is illustrated a general block diagram of a disclosed embodiment. A bar code scanning wand 1600 is provided by a wand distributor to customers and is associated with that distributor via a wand ID stored therein. The wand 1600 is either sold or freely distributed to customers for use with their personal computing systems. Since more and more products are being sold using bar codes, it can be appreciated that a user having the wand 1600 can scan bar codes of a multitude of products in order to obtain more information. Information about these products can be made immediately available to the user from the manufacturer for presentation by the user's computer 302. Beyond simply displaying information about the product in which the user is interested, the wand distributor may include additional advertising information for display to the user such as information about other promotions or products provided or sold by the wand distributor. Similarly, advertisers may provide catalogs of advertisements or information in newspapers or periodicals where the user simply scans the bar code associated with the advertisement using the wand 1600 to obtain further information. There is provided a paper source 1602 having contained thereon an advertisement 1604 and an associated bar code 1606. (Note that the disclosed concept is not limited to scanning of bar codes 1606 from paper sources 1602, but is also operable to scan a bar code 1606 on the product itself. Also, the wand 1600 can be any type of device that will scan any type of image having information encoded therein.) Further description of applications and operation of the bar code scanning wand 1600 and the use of the bar code information is found in pending U.S. patent application Ser. No. 09/151,471 filed on Sep. 11, 1998 and entitled "METHOD FOR INTERFACING SCANNED PRODUCT INFORMATION WITH A SOURCE FOR THE PRODUCT OVER A GLOBAL NETWORK," which application is incorporated by reference in its entirety herein.

After obtaining the wand 1600 from the wand distributor, the user connects the wand 1600 to their PC 302. During a scanning operation, wand 1600 reads bar code data 1606 and the wand ID into a "wedge" interface 1608 for conversion into keyboard data, which keyboard data is passed therefrom into the keyboard input port of PC 302. The importance of the wand ID will be discussed in more detail hereinbelow.

The wedge interface 1608 is simply an interface box containing circuitry that accommodates inputs from both the scanning wand 1600 and a computer keyboard 1610. This merely allows the information scanned by the wand 1600 to be input into the PC 302. In the disclosed embodiment, the wedge interface 1608 will convert any information. The data output from the wand 1600 is passed into the wedge interface 1608 for conversion into keyboard data which is readily recognizable by the PC 302. Therefore, the wand 1600 is not required to be connected to a separate port on the PC 302. This data is recognized as a sequence of keystrokes. However, the output of the wand 1600 can be input in any manner compatible with the PC 302. When not receiving scanner data, the wedge interface 1608 simply acts as a pass-through device for keyboard data from the keyboard 1610. In any case, the information is ultimately processed by a processor in the PC 302 and can be presented to the user on a display 1612. The wedge interface is operable to provide a decoding function for the bar code and conversion thereof to keystroke input data.

In operation, the product code of a product is provided in the form of a bar code 1606. This bar code 1606 is the "link" to a product. The disclosed embodiment is operable to connect that product information contained in the bar code 1606 with a web page of the manufacturer of that product by utilizing the bar code 1606 as the product "identifier." The program operating on the PC 302 provides routing information to the ARS 308 after launching the browser on the PC 302 and connecting to the ARS 308 over the GCN 306, which ARS 308 then performs the necessary steps to cause the browser to connect to the manufacturer web site, while also providing for an accounting step, as will be described in more detail hereinbelow.

The bar code 1606 by itself is incompatible with any kind of network for the purposes of communication therewith. It is primarily provided for a retail-type setting. Therefore, the information contained in the bar code 1606, by itself, does not allow for anything other than identification of a product, assuming that one has a database 1614 containing information as to a correlation between the product and the bar code 1606.

The wedge interface 1608 is operable to decode the bar code 1606 to extract the encoded information therein, and append to that decoded bar code information relating to an ID for the wand 1600. This information is then forwarded to the ARS by the resident program in the PC 302. This is facilitated by intermediate routing information stored in the program indicating to which node on the GCN 306 the scanned bar code information is to be sent, i.e., to the ARS 308. It is important to note that the information in the bar code 1606 must be converted from its optical image to numerical values which are then ultimately input to the keyboard input port of PC 302 and converted into data compatible with communication software residing on the PC 302 (in this case, HTML language for insertion into a browser program). When the scanned information is input to the PC 302, the resident program launches the browser program and then assembles a communication packet comprised of the URL of the ARS 308, the wand ID and the user ID. If another type of communications program were utilized, then it would have to be converted into language compatible with that program. Of course, a user could actually key in the information on the bar code 102 and then append the appropriate intermediate routing information thereafter. As will be described hereinbelow, the intermediate routing information appended thereto is the URL of the ARS 308 disposed on the GCN 306.

As part of the configuration for using the wand 1600, the PC 302 hosts wand software which is operable to interpret data transmitted from the wand 1600, and to create a message packet having the scanned product information and wand ID, routing information, and a user ID which identifies the user location of the wand 1600. The wand software loads at boot-up of the PC 302 and runs in the background. In response to receiving a scanned bar code 1606, the wedge interface outputs a keystroke code (e.g., ALT-F10) to bring the wand program into the foreground for interaction by the operating system. The wand program then inserts the necessary information into the browser program. The message packet is then transmitted to interface 304 across the global communication network 306 to the ARS 308. The ARS 308 interrogates the message packet and performs a lookup function using the ARS database 310. If a match is found between particular parameters of the message packet, a return message packet is sent back to the PC 302 for processing.

The wand program running on PC 302 functions to partition the browser window displayed to the user into several individual areas. This is for the purpose of preparing to present to the user selected information in each of the individual areas (also called "framing"). The selected information comprises the product information which the user requested by scanning the bar code 1606 using the wand 1600, information about the wand distributor which establishes the identity of the company associated with that particular wand 1600, and at least one or more other frames which may be advertisements related to other products that the wand distributor sells. Note that the advertisements displayed by the wand distributor may be related to the product of interest or totally unrelated. For example, if a user scans the bar code 1606 of a Company A soda, the wand distributor may generate an advertisement of a new soft drink being marketed by Company A, that it sells. On the other hand, the wand distributor may also structure the display of information to the user such that a user requesting product information of a Product X may get the requested information of Product X along with advertisements for a competing item Product Y. Essentially, the wand distributor is free to generate any advertisement to the user in response to the user requesting product information.

The return message packet transmitted from the ARS 308 to the PC 302 is then transmitted back across the GCN 306 to the advertiser server 312. The advertiser server 312 restructures the message packet and appends the particular product information for transmission back to the PC 302. Upon receiving the particular advertiser information from advertiser server 312, the PC 302 then retransmits a message to the wand distributor site 1616 and E-commerce site 1618 to obtain the information that needs to be framed in the browser window displayed to the user.

Therefore, the wand 1600 is associated with the wand distributor by way of a wand ID such that scanning a product bar code 1606 in order to obtain information about that particular product generates one or more responses from one or more remote sites disposed on the GCN 306. Stored in the wand 1600 is the wand ID which establishes its relationship to the wand distributor. Proprietary wand software running on the PC 302 operates to decode scanned bar code information and the wand ID received from the wand 1600 and wedge interface 1608, and also provides a unique user ID for establishing the location of the user of the wand 1600. The wand software also assembles message packets and works in conjunction with the on-board communication software (e.g., a browser) to automatically route the message packets across the GCN 306 such that the one or more remote sites disposed on the GCN 306 return information to be framed for presentation to the user.

Referring now to FIG. 16*a*, there is illustrated an addition to the flowchart of FIG. 14 for registering an input device, for one embodiment of the disclosure, with the ARS 308 in conjunction with a user ID. As described hereinabove, each user, when they generated their user profile when first contacting the ARS 308 to activate their software, defines a user ID for storage in their PC resident software. This user ID, as also described hereinabove, is utilized to identify the PC 302 to the ARS 308 whenever making a transaction. This is utilized for, among other things, updating profile information in the database 310. However, when an input device, such as the input device in the form of a wand 1600, is utilized, there are a number of ways to identify this wand 1600. One can be with the use of a unique wand ID associated with the wand 1600, as will be described hereinbelow. The other is to create a wand ID in the software program operating in the PC 302 running the PC resident background program as described hereinabove. In a situation where the ID is created in the program, reference is made to block 1410 of FIG. 14 and subsequent thereto. After the user has entered very specific information, jobs, history and demographics, etc., the system will then prompt the individual for information regarding the input device, as indicated by a function block 1630. This prompt will basically inquire as to whether the user has an input device for reading machine readable code or for sensing audible signals. It may desire to know whether the user has received an audible code from a broadcast system such as a TV, or the wand 1600 is being utilized to scan machine readable code in the form of a bar code. The program block will then flow to a function block 1632 wherein various input device types are presented to the user on their display returned over the network 306 from the ARS 308, and then the user selects which type of input device is attached to their computer. For example, it might be a scanning wand, it might be an audio input device, or any other type of device that allows for input of information. For example, it is conceivable that the unique wand ID is that of some type of tool being utilized in conjunction with the program as an input device. The unique wand ID could even be the idea of a disk drive wherein the wand ID would be generalized as a tool ID.

Once the type of input device is input, then the prompt will query what type of device is attached, such as the type of scanning wand 1600. The system will then ask for the distributor of the wand 1600. Of course, as described hereinabove, the wand 1600 could have embedded therein a unique wand ID which would remove the need for inputting the distributor, as the ARS 308 will recognize this particular wand ID. However, in the situation wherein the wand ID is not disposed within the wand 1600, then the user will have to view the wand or tool 1600 to determine the distributor thereof. This is what input information would then be noted in the user profile in the ARS 308. This allows the ARS 308, at a later time, to match up the user ID, requiring no other user ID, with their user profile to determine what distributor distributed their wand 1600, such that information can be returned associated with that distributor, as will be described hereinbelow. Therefore, the combination of a user ID and a corresponding entry in the database of the ARS 308 will constitute the wand ID or tool ID.

Referring now to FIG. 17, there is illustrated a conversion circuit of the wedge interface. A microcontroller 1700 provides conversion of the data from the wand 1600 and controls interfacing of the keyboard 1610 and wand 1600 with the PC 302. The microcontroller 1700 has contained therein a memory 1702 for storing a wand ID (or even a URL for some applications) or it can have external memory. There are provided a plurality of wand interfaces 1704 to the wand 1600, a plurality of PC interfaces 1706 to the PC 302, and plurality of keyboard interfaces 1708 to the keyboard 106. In general, the wand interfaces 1704 comprise a serial data line, a ground line, and a power line. Similarly, the keyboard interfaces 1708 comprise a serial data line, a ground line, a clock line, and a power line. The PC 302 provides a clock line, a power line, a serial data, and a ground line for input to the microcontroller 1700. The microcontroller 1700 is operable to receive signals from the keyboard 1610 and transfer the signals to the PC 302 as keyboard signals. Operation with the keyboard 1610 is essentially a "pass-through" procedure. Data output from the keyboard 1610 is already in keyboard format, and therefore requires no conversion by the wedge interface 1608. With respect to the wand 1600, the serial data is not compatible with a keyboard 1610 and, therefore, it must be converted into a keyboard format in order to allow input thereof to the keyboard input of the PC 302.

The microcontroller 1700 performs the conversion function after decoding this bar code information, and conversion of this bar code information into an appropriate stream of data which is comprised of the bar code information and the appended wand ID (or even a URL in some applications). This appended wand ID (and/or URL) will be pre-stored in the memory 1702 and is programmable at the time of manufacture. It is noted that the memory 1702 is illustrated as being contained within the microcontroller 1702 to provide a single chip solution. However, this could be external memory that is accessible by the microcontroller 1702. Therefore, the microcontroller 1700 provides an interface between the wand 1600 and the keyboard 1610 to the PC 302 which allows the wand 1600 to receive coded information and convert it to keyboard strokes or, alternatively, to merely pass-through the keystrokes from the keyboard 1610. Therefore, the user need not install any type of plug-in circuit board into the motherboard of the PC 302 in order to provide an interface to the wand 1600; rather, the user need only utilize the already available keyboard port in order to input the appropriate data into the system.

In this particular disclosed embodiment, the microcontroller 1700 comprises a PIC16C73 microcontroller by Microchip Technologies™. The PIC16C73 device is a low cost CMOS 8-bit microcontroller with an integrated analog-to-digital converter. The PIC16C73 device, as illustrated in the disclosed embodiment, has 192 bytes of RAM and 4 k×4 of EPROM memory. The microcontroller 1700 can accommodate asynchronous or synchronous inputs from input devices connected to it. In this disclosed embodiment, communication to the keyboard 1610 is synchronous while it is asynchronous when communicating with wand 1600.

It should be noted that, although in this particular embodiment bar code information of the bar code 1606 is input into the keyboard input port of the PC 302, disclosed methods may also be advantageously utilized with high speed port architectures such as Universal Serial Bus ("USB") and IEEE 1394.

Bar codes are structured to be read in either direction. Timing considerations need to be addressed because of the variety of individuals scanning the bar code introduce a wide variety of scan rates. Bar codes use bars of varying widths. The presence of a black bar generates a positive pulse, and the absence of a black bar generates no pulse. Each character of a conventional bar code has associated therewith seven pulses or bars. Depending on the width of the bars, the time between pulses varies. In this disclosed embodiment, the interface circuitry 1608 performs a "running" calculation of the scan time based upon the rising edge of the pulses commencing with the leader or header information. The minimum and maximum scans times are calculated continuously in software with the interface 1608 during the scanning process to ensure a successful scan by the user.

Referring now to FIG. 18, there is illustrated a sample message packet transmitted from the user's PC 302 to the ARS. The message packet 1800 comprises a number of bits of information including the bar code information 1802 obtained from the user scanning the bar code with the wand 1600; the wand ID 1804 which is embedded in a memory in the wand 1600 and identifies it with a particular wand distributor; and a user ID 1806 which is derived from the software running on the PC 302 and which identifies uniquely with the user location. Note that the message packet includes other necessary information for the proper transmission for point to point.

Figure 19:
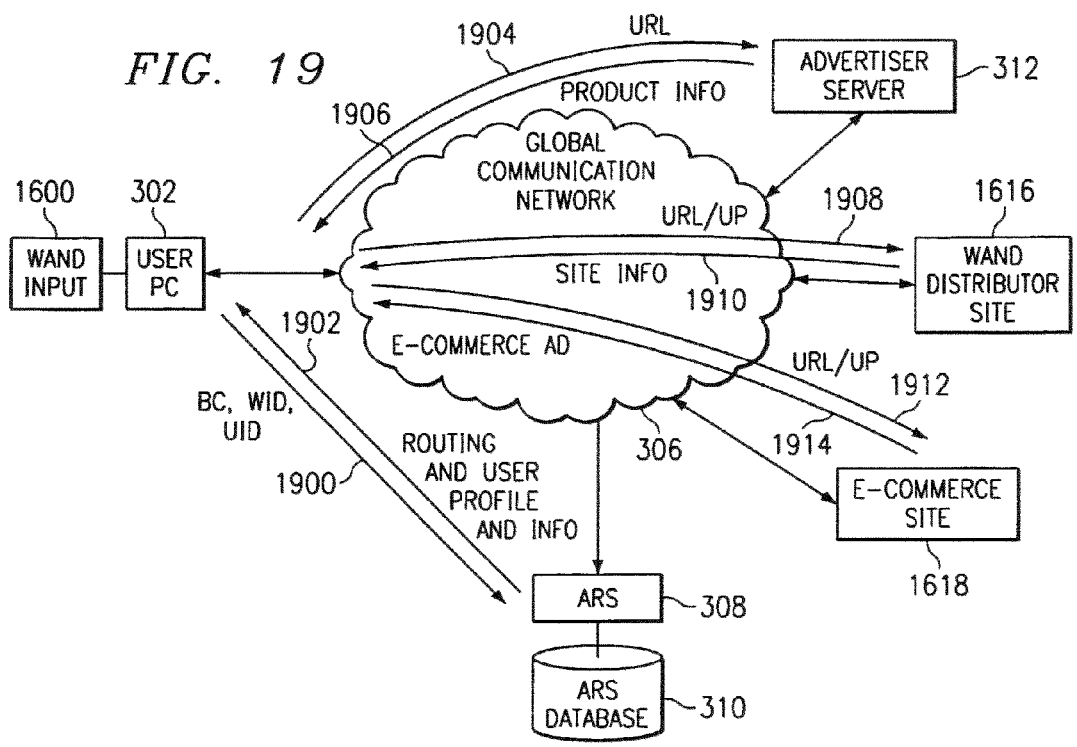
FIG. 19 illustrates a more detailed block diagram of the routing of the message packets between the various nodes.

Referring now to FIG. 19, there is illustrated a more detailed block diagram of the routing of the message packets in order to present the framed information to the user. As is mentioned hereinabove, when the user scans a bar code 1606 using the wand 1600, a wand program running on the user PC 302 is operable to interpret the information output by the wand 1600 and generate a message packet for transmission over the GCN 306. The wand program assembles the message packet such that it is directed to the ARS 308 disposed on the GCN 306. The message packet contains several pieces of information including the wand ID 1804 which links it to the wand distributor, the user ID 1806 which identifies the particular user using the wand 1600, and bar code information describing a particular product of interest to the user. This message from the PC 302 is transmitted over a path 1900 to the ARS 308 where the ARS database 310 is accessed to cross reference the ID information and bar code information to a particular advertiser and wand distributor. The ARS 308 returns a message packet over a path 1902 to the user PC 302 which contains routing information as to the location of various other sites disposed on the GCN 306, for example, the advertiser server 312 and wand distributor site 1616.

It is noted that, when the wand (or tool) is utilized, the program at the PC may recognize this and merely input the user ID in the wand (or tool) ID field. Alternatively, the mere receipt of a user ID in association with product code information will trigger the ARS 308 to assume that the wand 1600 was utilized. It is only important that the use of the wand (or tool) be recognized and that the user's PC be routed to a location on the network preassociated with that wand (or tool) distributor. Further, it is the routing of the user's PC to a predetermined location on the network based upon the use of a particular tool, a particular type of tool or a general class of tools that elicits the connection. For example, it would be that the network connection is made in response to the user utilizing a barcode scanner. This would connect the user to a web site for a general barcode scanner tool. For a disk drive, the program would recognize that a disk drive had been installed (or merely used) and then route the user to the web site of the disk drive manufacturer, a competitor of such or even to some marketing firm that wants to contact individuals that use or initiate such a piece of equipment.

It can be appreciated that other information can also be provided by the ARS 308 which more closely targets the particular user of the wand 1600. For example, if it is known that a particular wand 1600 is sold in a certain geographic area, this information can be useful in targeting the particular user with certain advertising information relevant to that geographic area. In any case, the information returned from the ARS 308 over path 1902 provides enough information for the wand program running on the user PC 302 to identify a number of other sites disposed on the GCN 306. The user PC 302 then processes the return message packet and routes another message packet over a path 1904 to the advertiser server 312. The advertiser server 312 then returns product information of the particular product in which the user was interested back to the user PC 302 over a path 1906. Similarly, the user PC 302 routes information (e.g., the URL of the wand distributor site and the user profile) to the wand distributor site 1616 over a path 1908 in order to obtain information back over a path 1910 for framing any banners which identify the wand distributor. Additionally, the user PC 302 forwards a message packet to the E-commerce site 1618 over a path 1912 in order to return information regarding any particular advertisements the wand distributor wants to display to the user. The advertisements are returned to the PC 302 over a path 1914.

Figure 20:
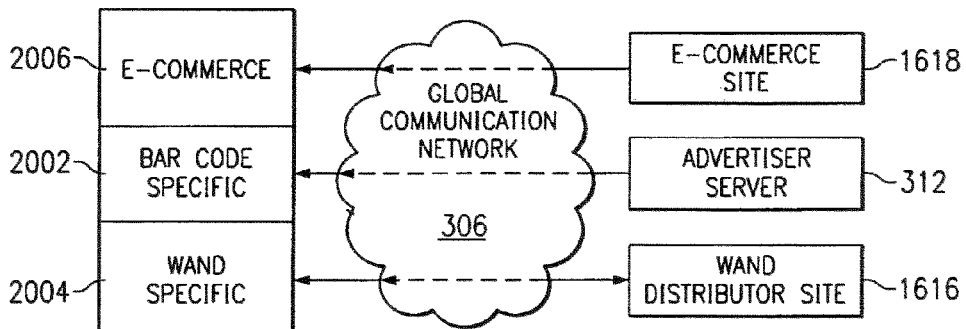
FIG. 20 illustrates a block diagram of a browser window, according to a disclosed embodiment.

Referring now to FIG. 20, there is illustrated a block diagram of a browser window according to the disclosed embodiment. The browser window 2000 is partitioned into a plurality of areas for framing specific information. A bar code area 2002 displays that product information in which the user was interested; a wand specific area 2004 displays information about the wand distributor; and an E-commerce area 2006 displays advertising information that the wand distributor selects for display according to this particular user and wand 1600. As mentioned hereinabove, a program operable to process scanned bar code information with the unique wand 1600 develops the browser window by partitioning it into specific areas for the framing of information. Therefore, information returned from the E-commerce site 1608 is passed through the GCN 306 to the particular E-commerce frame 2006. Similarly, information about the particular product of interest is returned from the advertiser site 312 across the GCN 306 to the particular bar code specific area 2002. Information placed in the wand specific area 2004 is information about the wand distributor which is returned from the wand distributor site 1616 across GCN 306.

Figure 21:
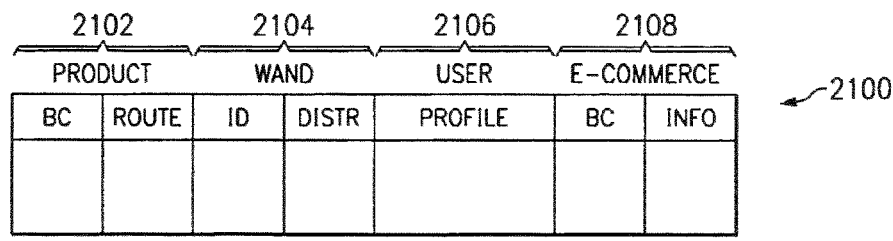
FIG. 21 illustrates a diagrammatic view of information contained in the ARS database.

Referring now to FIG. 21, there is illustrated a structure of information contained in the ARS database. The ARS database 310 contains a variety of information required to properly interrogate and assemble packets for obtaining information from the various sites disposed on the GCN 306. The ARS database 310 has a database structure 2100 which contains addresses for the web sites containing the product information requested by the user when scanning the bar code 1606 with the wand 1600. Under a product heading 2102 are listed the particular bar codes and associated routing information for addressing the respective server location. For example, the ARS server 308 may contain any number of advertisers having unique URL addresses associated therewith. Therefore, the bar code 1606 of a particular product is associated with a unique URL address which routes any request for information of that product to that particular advertiser's site. Also part of the ARS database structure 2000 is a heading of wand under which is the wand ID 1804 and the distributor associated with that wand ID 1804.

It can be appreciated that there may be a number of distributors using the disclosed architecture such that each distributor has an ID embedded in the wand which uniquely identifies that wand with the particular distributor. Therefore, the unique wand ID 1804 needs to be listed with the respective distributors of that wand 1600 in order to process the information that needs to be framed and displayed to that particular user. Another heading under the ARS database structure 2100 is a user heading 2106 which contains profile information associated with that particular user ID 1806. As mentioned hereinabove, the user ID 1806 is obtained via the wand software running on the PC 302 and upon installation or subsequent configuration may request that the user input certain profile information which may be used to target that particular user with products and services which identify with that user profile. The ARS database structure 2100 also contains an E-commerce heading 2108 which contains information related to the bar code 1606 and an advertisement that may be triggered by the request for that information. For example, any bar code 1606 associated with a paper source 1600 can be associated with the specific information in the ARS database 310. A user wishing to obtain information about a specific soft drink may, in fact, trigger an advertising response of a competitor product. Similarly, the user interested in information about that particular soft drink may also trigger information which is relevant to that particular product or a product which may normally be served in conjunction with that soft drink. Furthermore, if the user profile indicates that this individual has significant interest in finance or insurance, the request for information regarding this particular bar coded product may trigger advertisement from an E-commerce server 1618 related to information about finance and insurance. It should be noted that the information described as contained within the ARS database structure 2100 is not limited to what has been described, but may comprise any number of pieces of information used to present desired information to the computer display of the user.

Figure 22:
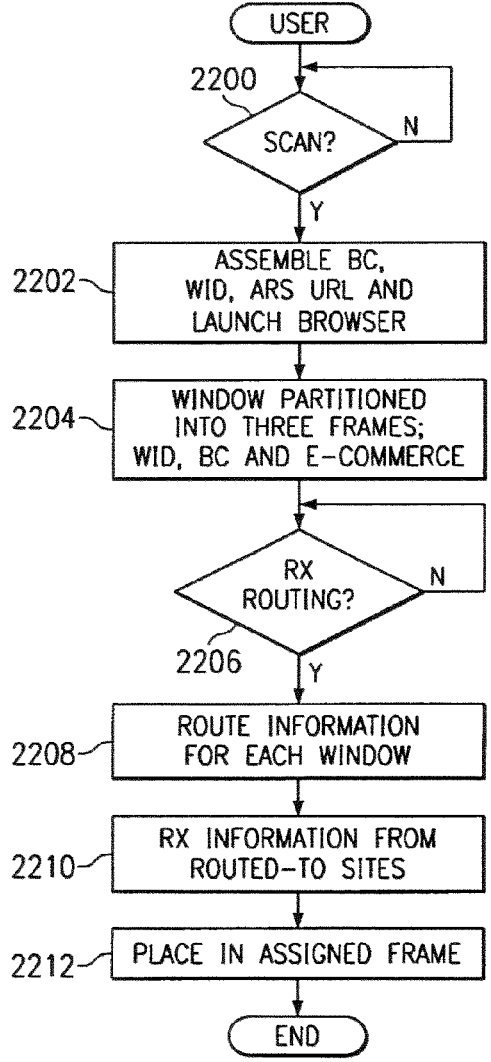
FIG. 22 illustrates a flowchart of the process of receiving information for the user's perspective.

Referring now to FIG. 22, there is illustrated a flowchart of the process of receiving information from the user's perspective, and according to the disclosed embodiment. The wand software running on the user's PC 302 runs in the background until activated by output from the wand 1600. Therefore, flow moves to a decision block 2200 where if a scanned input does not occur, flow moves out the "N" path and loops back to the input of decision block 2200. On the other hand, if scanned input information is received, flow moves out the "Y" path to a function block 2202 where the wand software assembles a message packet containing the bar code information, the wand ID 1804 and the ARS 308 URL address. Additionally, the browser is launched in which this information is placed for transmission to the ARS 308. Flow then moves to a function block 2204 where the browser is partitioned into any number of areas in which information is displayed when obtained from the wand distributor site 1616, the E-commerce site 1618, and the advertiser server 312. It should be known that although three frames are shown in the particular window 2000 of this embodiment, the number of frames displayed in the window 2000 is limited only by the available real estate of the window 2000 area itself.

After the wand software partitions the browser window into one or more frames in preparation of receipt of return information, flow moves to a decision block 2206 where the computer waits for information to be returned from the various sites disposed on the GCN 306. If information is not returned, flow moves out the "N" path and simply loops back to the input to continue monitoring for receipt of the information. If information has been received, flow moves out the "Y" path to a function block 2208 where routing information for each frame (or partitioned area of the window 2000) is inserted into one or more packets for transmission to the various sites. The various sites then return the requested information back to the PC 302, as indicated in function block 2210. Flow is then to a function block 2212 where the proprietary software working in conjunction with the hosted browser places the returned information into the respective frames of the window. The user, viewing the display at PC 302, then perceives a variety of information, one of which is the particular product information which he or she requested, in addition to wand distributor information, and possibly other advertisements based upon the user's profile.

Figure 23:
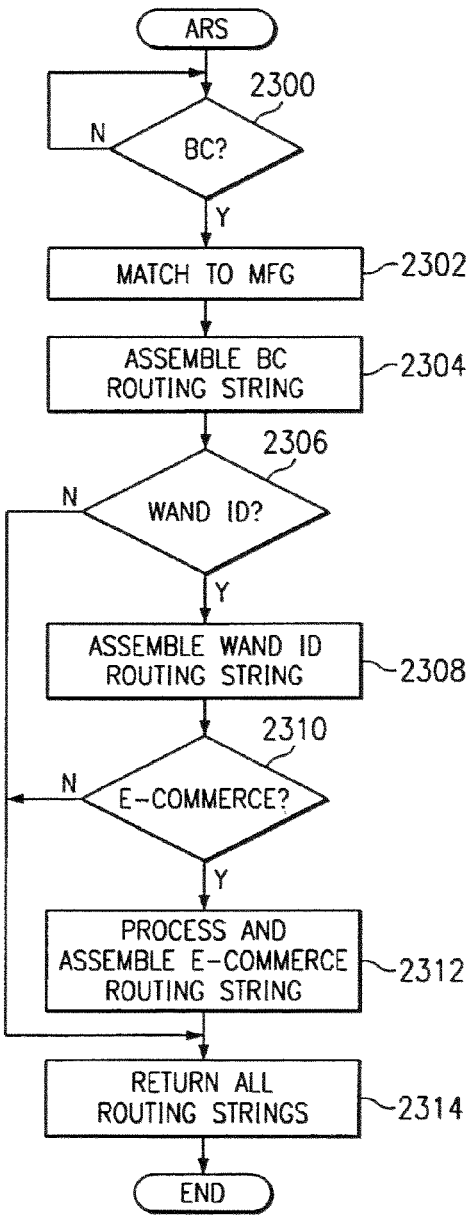
FIG. 23 illustrates a flowchart according to the ARS.

Referring now to FIG. 23, there is illustrated a flowchart of the process according to the ARS. The ARS 308 is operable to decode and process message received from the GCN 306. Therefore, flow is to a decision block 2300 where, if bar code information is not received, flow is out the "N" path with loop-back to its input. If bar code information has been received, flow is to a function block 2302 where a matching process occurs to link the bar-coded product information to its respective manufacturer. The ARS database 310 also associates the URL address of the manufacturer's server. When a match is found, the ARS 308 begins to assemble a message packet of information for transmission back to the PC 302, as indicated in function block 2304. The message packet contains the product information and the URL address of the manufacturer's web site. Flow then moves to a decision block 2306 where the wand ID 1804 is compared with the list of wand IDs issued by the particular wand distributor. If the wand ID 1804 is validated, flow moves out the "Y" path to a function block 2308 where the message packet is appended with the wand ID 1804 and distributor routing address. Flow then moves to a decision block 2310 where the ARS 308 determines if any E-commerce information is to be associated with a particular wand ID 1804. If so, flow is out the "Y" path to a function block 2312 where the message packet is appended with the E-commerce routing string. The E-commerce routing string provides addressing for the E-commerce server 1618. Flow then moves to a function block 2314 where all message packets are returned back to the PC 302 for processing.

Referring back to decision block 2306, if the wand ID 1804 is determined to be invalid, flow moves out the "N" path and jumps forward to the input of decision block 2314, since the lack of a wand ID 1804 interrupts the link to any advertising provided by the E-commerce server 1618. At this point, the only information provided is the link to the adverse server 312 for return of product information. Referring now to decision block 2310, if no E-commerce information is available, flow moves out the "N" path and jumps forward to the input of function block 2314 where the message packet back to the PC 302 contains only the URL of the advertiser server 312, the bar code information, the distributor server 1616 address and wand ID 1804 information.

Figure 24:
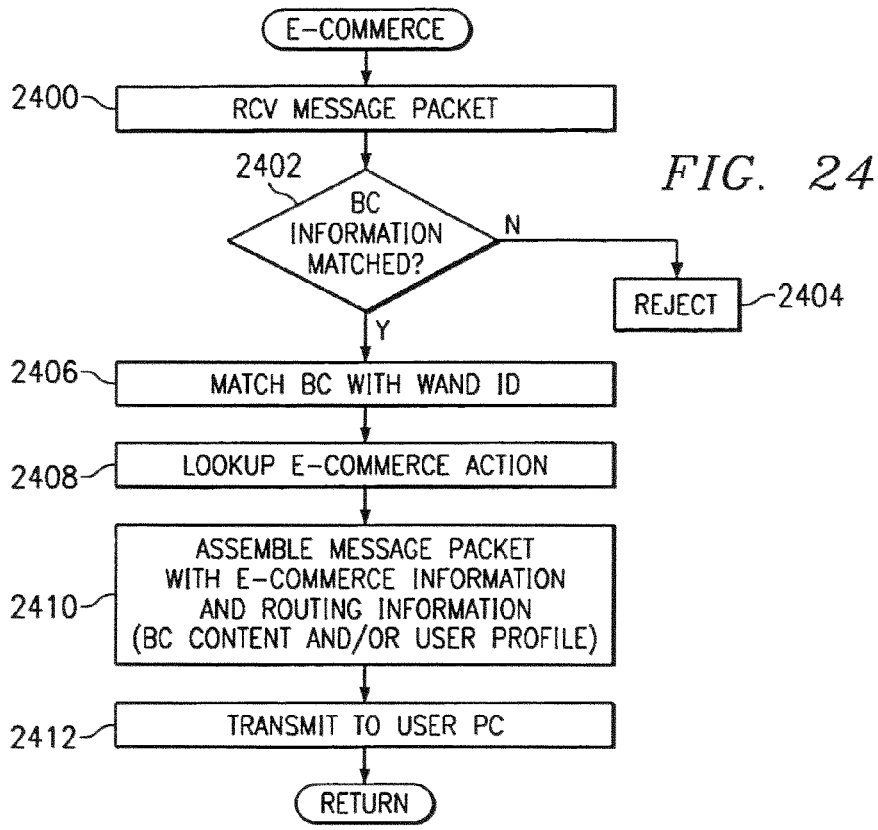
FIG. 24 illustrates a flowchart of the process performed at the E-commerce node.

Referring now to FIG. 24, there is illustrated a flowchart of the process performed at the E-commerce site. The E-commerce server 1618 receives the message packet from the user PC 302, as indicated in function block 2400, and decodes the packet to perform a match with the bar coded information. Moving on to a decision block 2402, if the match is unsuccessful, flow is out the "N" path to a function block 2404 where the match is rejected. A message may be returned to indicate that a problem occurred and the user may need to re-scan the product bar code 1606. If a successful match occurs, flow moves out the "Y" path to a function block 2406 where the wand ID 1804 is matched with the bar code product information. The bar coded information may be distributed to customers over a large geographic area. However, the wand 1606 may be coded for certain geographic areas. For example, a wand 1600 having an XXX ID may be restricted for sale in the Southwestern United States while a wand 1600 having a YYY ID may be sold only in the Northeast. In this way, geographic areas may be targeted with advertising more appealing to that particular area. Advertising returned to the user PC 302 may be focused further by obtaining a user profile when the software or wand 1600 are installed. In this way, advertising may be focused based upon the user profile. Therefore, flow moves to a function block 2408 to lookup the E-commerce action based upon the wand ID 1804 and the bar code information. Flow moves to a function block 2410 to assemble all the information into a packet for return to the user PC 302. The product information and/or user profile information may be returned. Flow is then to a function block 2412 where the message packet is transmitted.

Figure 25:
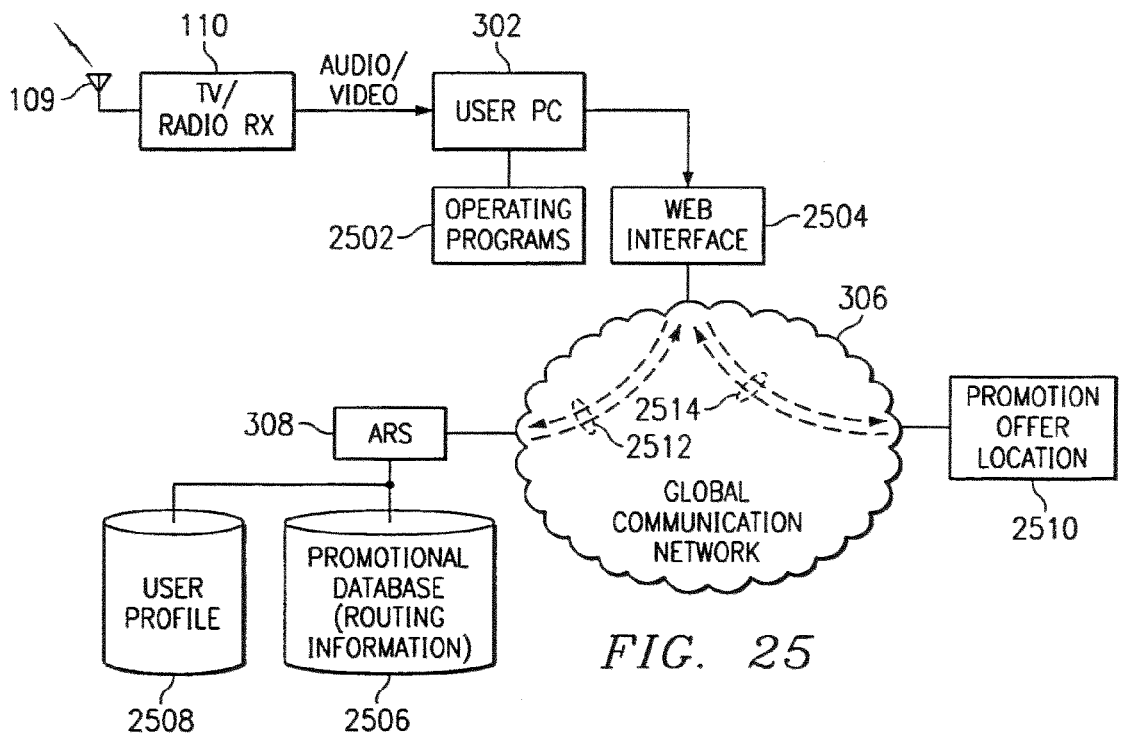
FIG. 25 illustrates a block diagram of the system for allowing promotional offers to be provided over the network.

Referring now to FIG. 25, there is illustrated a system for allowing an advertiser to offer a promotion over a broadcast system to a user utilizing the structure described hereinabove. From a general standpoint, this will allow the advertiser to provide over the broadcast channel, in the background, an audio or video indicia (or combination thereof) to a user which is sensed by the user PC 302 and then the user PC 302 interconnected with a defined location on the network for interfacing with the advertiser to actually promote some offer over the network 306 utilizing the system described hereinabove. As described hereinabove, a broadcast signal is received by the receiver 110 which can be a television receiving a television broadcast, or even a radio. This will provide, in the case of the television, an audio and/or video output and, in the case of a radio, an audio output. This audio output is input to the user PC 302 by, for example, an audible connection via a speaker and microphone or by hard-wired connection. User PC 302 operates various programs for sensing the audio system, as set forth in an operating program region 2502, and also as described hereinabove. This operating program region basically contains the operating programs that are running in the background or the foreground. In the present disclosure, a program will be running in the background or foreground to continually sense any audible signals that are received. In the event that a tone or specific signal is received that is recognized by the background operating program (or foreground operating program) as being associated with an advertisement, this program will then cause the user PC 302 to interconnect with the web 306 through a web interface 2504, which is similar to the modem 114 described hereinabove with respect to FIG. 1. This allows a web interface 2504 to interface with the network 306. In the present embodiment, the initial operation is performed by the operating program 2502 wherein a web browser is launched and the web browser utilized by the operating program to interface with locations on the network. However, it could be that the operating program in the background for sensing the audio and/or video signal does not require the web browser to interconnect with the network. It should be understood that this program could either interface directly with the network by directly interfacing with the TCP/IP gateway in the user PC 302, or utilize the web browser as the interface to the web 306.

Initially, the web 306 is accessed such that information regarding the received tone, i.e., the decoded tone itself, is transmitted to the ARS 308. In this embodiment, the ARS 308 will have a promotional database 2506 associated therewith and a user profile database 2508. As described hereinabove, the user profile database 2508 is created when the user initially receives the particular operating program that allows sensing of the audio input and assessment access to the web 306. This will require the user to input a particular profile, which profile is then stored in the user profile database 2508 and a unique user ID associated with user PC 302 via the operating program for transmission at a later time to the ARS 308. When the ARS 308 receives this user ID, it can be compared with corresponding user IDs in the user profile database 2508 (of which there should only be one) and then extract the user's profile information. This basically allows user profile information to be stored without requiring it to be constantly re-transmitted from the user PC 302. However, it could be stored at the user PC 302. The promotional database 2506 contains information regarding the decoded information from the broadcast which was received by the user PC 302 and has associated therewith routing information. Therefore, for each encoded tone that is transmitted by the broadcaster, there will be an associated decoded word or value in the database 2506 with certain information associated therewith. A minimum requirement is that there be routing information to allow the user PC 302 interface to the network 306 to interconnect with a promotion offer location 2510. However, there could be other information that is transmitted. This information is then, as described hereinabove, relayed back to the user PC 302. This connection between the user PC 302 and the ARS 308 is represented by interconnection pass 2512 in the network 306.

After this information is returned to the user PC 302, the user PC 302 will utilize this routing information to interconnect the user PC with the promotion offer location 2510 to allow a bi-directional path, as represented by a path 2514 in the network 306. In addition to providing the routing information, the ARS 308 will also send back to the user PC 302 the user profile and any other information required by the promotion that would be stored in the promotional database 2506, and this will be assembled into a packet for transmission from the user PC 302 to the promotion offer location 2510 on the network 306. Note that the promotion offer location 2510 need not receive the code to understand what type of promotion was located. For example, it could be that the information returned to the user PC 302 for relay to the promotion offer location 2510 was a string of characters utilized by the browser consisting of domain name and subsequent instructions, which subsequent instructions would indicate to the promotion offer location 2510 certain actions that needed to be taken through HTML instructions which are conventional. These, of course, are provided by the operator of the promotion offer location 2510 to the operator of the ARS location 308 for storage in the promotional database 2506. Thus, when the particular unique information is received from the user PC 302, which was forwarded thereto by the broadcaster, this information will be associated with any information that the operator of the promotion offer location offered, i.e., that the promoter wants to have associated therewith. This association, of course, is what the ARS 308 utilized to assemble a relay string, this being the URL of the promotion offer location 2510 and various other information associated therewith, such as particular HML codes for use by the promotion offerer.

Figure 26:
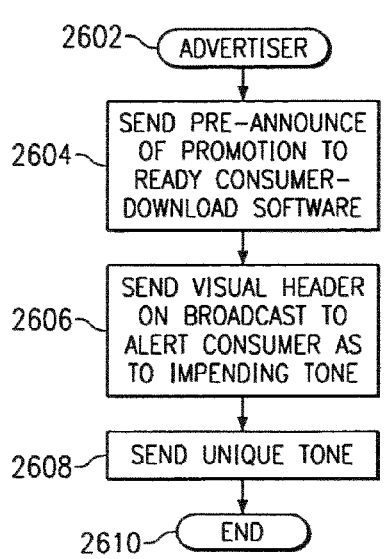
FIG. 26 illustrates a flowchart depicting the operation at the advertiser for initiating a promotional offer.

Referring now to FIG. 26, there is illustrated a flowchart depicting the generation of the unique tone by the broadcaster. This is initiated at a block 2602 and then proceeds to a block 2604 wherein a pre-announcement is sent of a promotion that is going to be offered by a promoter. The purpose of this is that the promoter would like to have as many individuals as possible join in the promotion. However, in order to recognize a tone or visual stimulus to a user, the user must have a PC running a particular proprietary software associated with the ARS 308 to provide the "listening" function.

Therefore, this promotion can be provided to the user via the broadcast, either a short time before or even days before the actual promotion is offered. This is very similar to the situation wherein news programs advertise a newsworthy event and the reporting thereof on the "Eleven O'clock News," wherein the sum total of the advertisements for that news report far exceed the length of time of the actual news report, the pre-advertising luring viewers to the entire news report for the purpose of increasing viewership. Further, this allows the individual to, if they do not already possess the software, go to the web site for the ARS 308 or some other web site, and download the software. For example, the advertisement would indicate that "for software to access this promotion, go to www.softwareprovider.com to download the required software." Alternatively, the announcement may just be a way to ensure people do not walk away from television during an advertisement interruption in a program. At a later time, an actual visual header is sent to the individual via the broadcast to indicate that the stimulus is about to be sent, as indicated in a function block 2606. Typically, this will be some type of bouncing unique and recognizable "bug" that appears on one corner of the television set, which will be recognized by individuals as preceding a unique indicia of a network link. The program will then proceed to function block 2608 to send the unique tone or even a unique video signal in another embodiment, and into an End block 2610.

Figure 27:
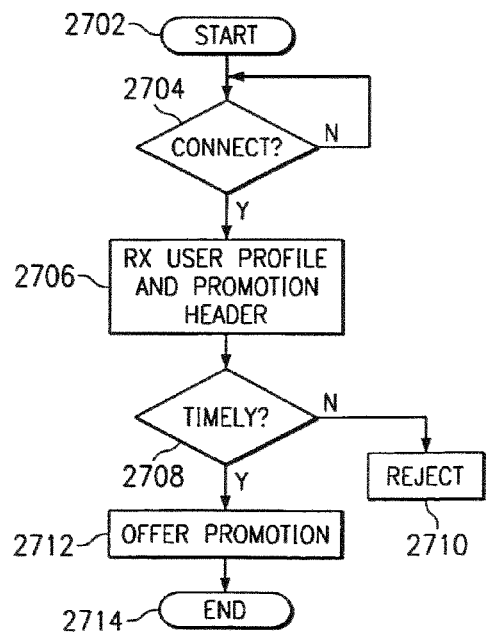
FIG. 27 illustrates the operation at the user's PC for interconnecting with the promotion.

Referring now to FIG. 27, there is illustrated a flowchart depicting the operation at the promotion offer location 2510. The program is initiated at block 2702 and proceeds to a decision block 2704 to determine if an Internet connection has been made to a new user requesting information. This, as described hereinabove, is facilitated by going to the ARS 308, requesting routing information and then using this routing information to make the connection. Also as described hereinabove, this is facilitated by sending a user ID and the encoded information from the received stimulus to the ARS 308. The program would continue in a loop until the connection is made, at which time it will proceed to a function block 2706 to receive the user profile and promotion header information which was provided by the ARS 308 in the form of a relay. The program then flows to a decision block 2708 to determine if the information has been received in a timely manner. There are certain situations wherein a promotion must be timely to obtain the full effect of a promotion. This could be thwarted in a situation wherein an individual would record the program with the advertisement sections and then use this to stimulate his computer. Further, this tone could be used to continually log on for a promotion to obtain more than "one bite of the apple." Of course, in other situations, the promoter would welcome a request at any time and any number of requests from a single user. If it is not timely, the program will flow to a reject box 2710 and, if timely, the program will flow to function block 2712 to offer the promotion and then to an End block 2714.

Figure 28:
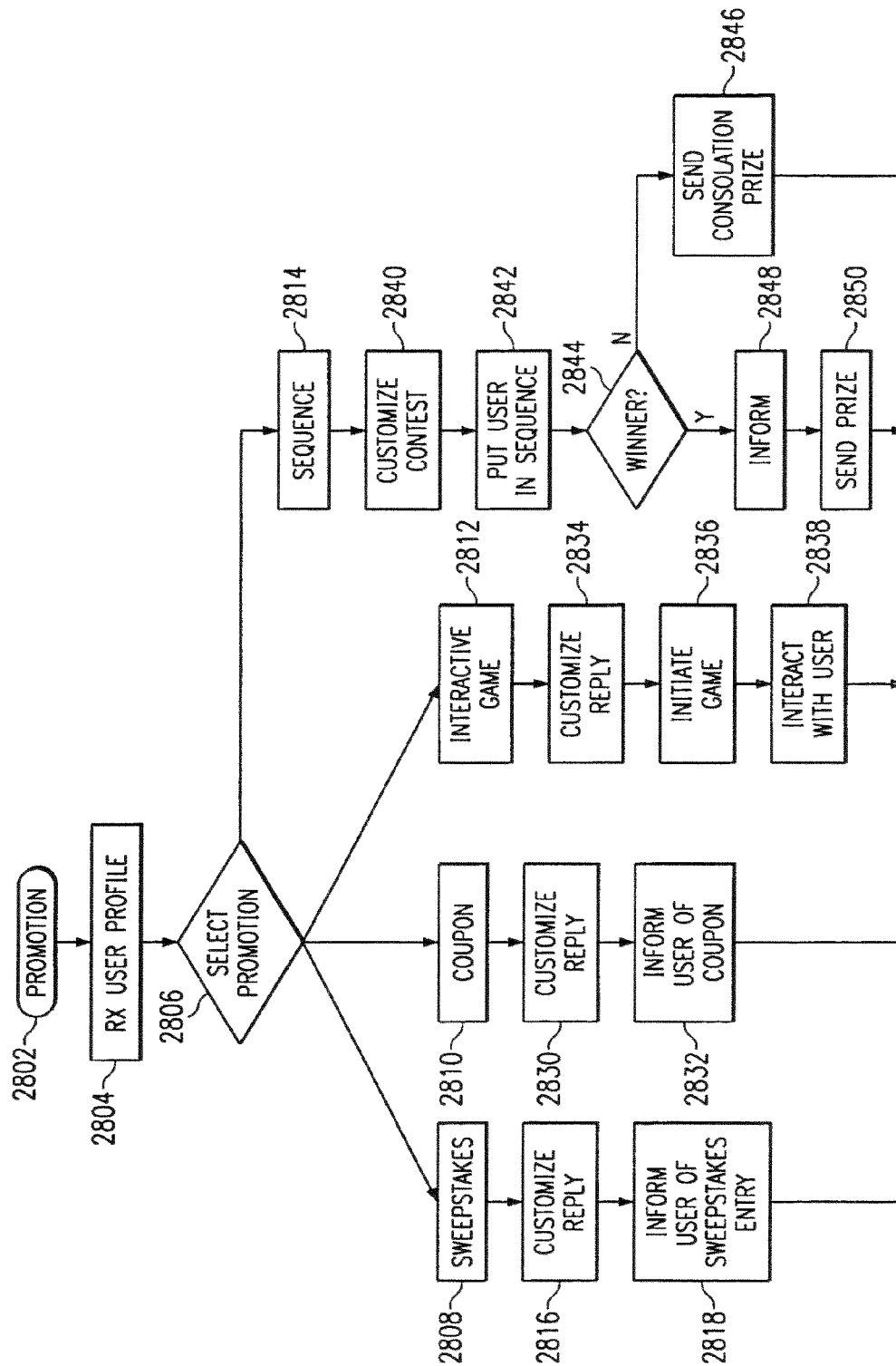
FIG. 28 illustrates a flowchart depicting the operation at the advertiser of completing the promotion after interfacing with the user.

Referring now to FIG. 28, there is illustrated a flowchart for the offer promotion operation at the location of the promoter, which initiated at a block 2802, then proceeds to function block 2804 wherein the user's profile is received and then to a multi-point decision block 2806 wherein the promotion is selected, or there could be a plurality of selections of different types of promotions offered by the same promoter. The type of promotion is determined by the header information forwarded to the promoter in conjunction with the information in the promotional database 2506. One type of promotion could be a sweepstakes represented in block 2808, wherein all individuals are entered into some type of selection process offering a single large prize, this being solely for receiving the profile information stored in the user profile database 2508. Note that this is usually the main desire of a sweepstakes provider, other than to link it to its web page to try and solicit the purchase of magazines or other articles. By the means of a user profile in the user profile database 2508, this is an important step to bypass. Another promotion could be an electronic coupon, represented in a block 2810. These are referred to typically as "Ecoupons," which would provide some type of coupon to an individual. Another type could be an interactive game, as represented by a block 2812, which allows the user to interface in an interactive manner with the promoter's web site. Another promotion is a sequencing-type promotion, indicated by a block 2814, wherein the individual is placed into a sequence and it the place in the sequence that may produce the reward.

With respect to the sweepstakes, once the sweepstakes promotion is selected, the program proceeds from the function block 2808 to a function block 2816, wherein a customized reply or interface will be provided to the particular user based upon the profile information received. As such, a certain individual indicating a preference for books may be put into a sweepstakes associated with books and an individual indicating a strong preference for sports may be put into a sweepstakes associated with sports prizes. This provides possibly more incentive for an individual to spend time at a particular site. The program then flows to function block 2818 wherein the user is informed of the sweepstakes entry and how the user will be contacted in the future. The program then flows to an End block 2820.

In the situation where the promotion is a coupon, the program will flow from block 2810 to a function block 2830 to generate a customized reply to the user based upon the user profile and the type of information to be presented to that particular user. It could be coupons for sporting events, associated with a strong sporting preference, or with literary events, associated with a strong literary preference. The program will then flow to function block 2832 wherein the user is informed of the coupon and how to exercise the coupon. This exercise may actually be a link to a book provider web site, wherein the user is actually provided a coupon on a web site. Further, the customized interface with the user could actually route that user, based upon preferences in the user profile, to a different web site to offer an electronic coupon. Once completed, the program flows to the End block 2820. Utilizing the interactive game, the program will flow from the function block 2812 to a function block 2834 wherein, again, the interface with the user is customized based upon preferences. A game of some type is initiated, as indicated by block 2836 and then the system interacts with the user, as indicated by function block 2838. The program, after completion of the interaction, will proceed to the End block 2820.

For the sequencing operation, this will first flow to a function block 2840 from function block 2814 to customize the contest in accordance with the user's profile, as described hereinabove. The user is in place in a sequence, as indicated by function block 2842 and then a determination is made as to whether the user is a winner, as indicated by decision block 2844. If not, the program will go to function block 2846 to send a consolation prize, then to End block 2820. However, if the user is a winner, he will be informed by block 2848 and then proceed to function block 2850 to send the prize, this being any number of incentives over the network, possibly in the form a credit or coupon, and then to the End block 2820. Although here are listed only four promotions, there can be any type of promotion that is offered in response to receiving the user profile and the actual connection with the user network via routing information proved by the ARS 308.

Figure 29:
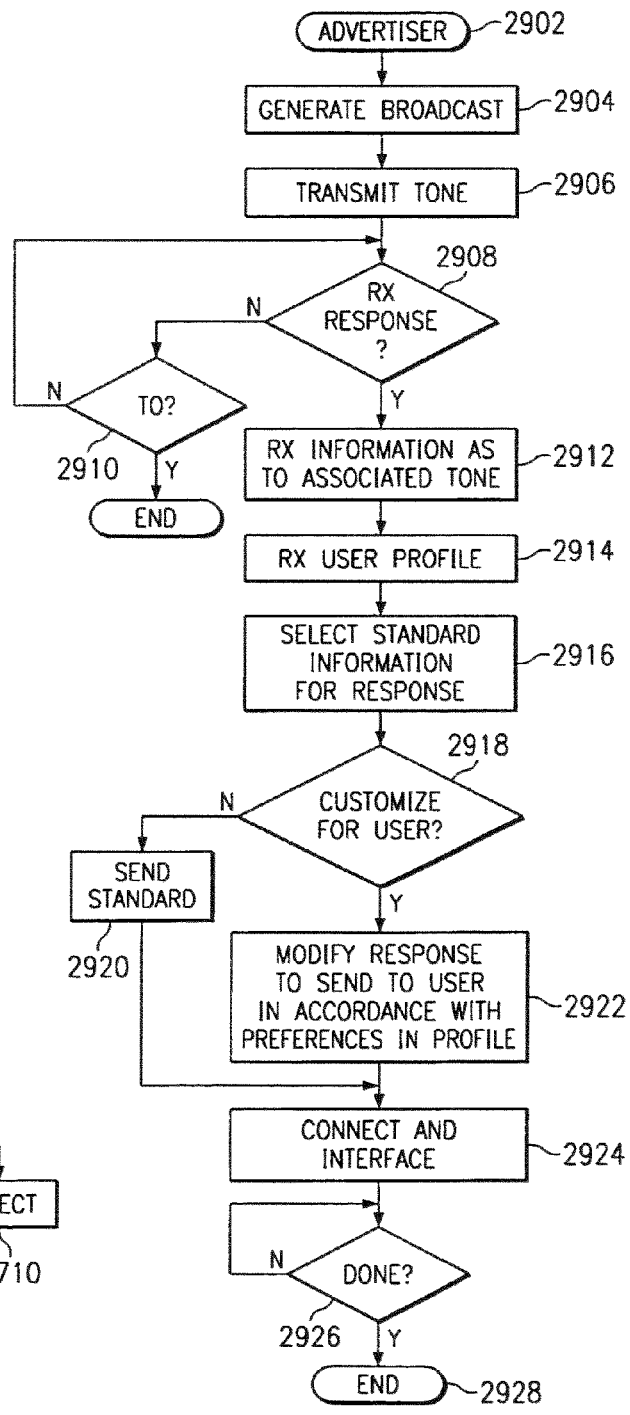
FIG. 29 illustrates a flowchart of the interaction of an advertiser with a user, wherein the user profile is used for customizing purposes.

Referring now to FIG. 29, there is illustrated a flowchart depicting the operation of an advertiser sending a broadcast out over the web. The program is initiated at a block 2902 and then proceeds to a function block 2904, wherein a broadcast is generated. This broadcast typically is comprised of an advertising broadcast, which advertising broadcast is a portion of an overall broadcast or program. This broadcast is delivered at a predetermined time by a broadcasting station over some type of commercial or private broadcast network. During the broadcast, a tone is transmitted, as indicated by a function block 2906. This tone, as described hereinabove, is a unique tone which has digital information encoded therein. This tone with its digital information, as also described hereinabove, is received by the user's PC 302, decoded and the digital information extracted therefrom. It should be understood that a unique optical encoded area could be provided in place of the tone somewhere in the display area, with digital information embedded therein in the form of encoded information. This optical area can be read by the user PC 302 to extract the information therefrom. Further, any method for delivering the encoded information to the user automatically is anticipated by this disclosure.

After transmission of the tone, the program proceeds to a decision block 2908 to wait for a response. If no response has been received, the program will flow along an "N" path to a timeout block 2910. This timeout function is to determine if the system is working. If the timeout has occurred, the program will default and, if not, it will loop back to the input of decision block 2908. When the response has been received, such as a user interconnecting with the network, the program will flow along a "Y" path to a function block 2912 to receive the information associated with the associated tone. It should be understood that a particular advertiser may receive multiple responses to multiple advertisements. Typically, this is set forth in the URL and the HTML code associated therewith. This code will typically route the user to a particular location on the advertiser's server. Once this information has been received, the program will flow to a function block 2914 wherein the user's profile will be received. As described hereinabove, this user's profile has been stored at the ARS 308 location, which is then relayed back to the user's PC 302 for assembly into a packet for transmission to the advertiser's location. The program will then flow to a function block 2916 to select standard information for a response, this being the basic starting point. The program will then flow to a function block 2918 to determine if this particular advertisement is to be customized for the user. In some situations, the response need only send the standard information. However, there are situations wherein the response needs to be customized for the user. It may be as simple as putting information in the header of the reply to the user such as "Hello John, here is the information you requested." It could also be much more complex in the form of the way in which the information is forwarded back to the user. It could be that the advertiser that returns information back to the user in response to their request would want to send certain other advertising information or links to the user. If the user requested information regarding an alcohol commercial, there may be some link between alcohol consumers and outdoor sporting activities. A banner location (area in the display associated solely with advertisements) on the display sent back to the user may incorporate some advertising link with an outdoor sporting goods establishment. This advertiser could then get additional advertising revenue by providing this link to a user. Of course, this is based upon the user's profile indicating the user has a preference for sporting goods. If the user, alternatively, had a preference for traveling to Europe, a European travel site could be provided in this banner location. It is only important to note that the customization, if applicable, allows all information provided to be customized based upon the user's profile to more readily target a particular user's demographic information, desires and/or preferences. If not customized, the program flows along an "N" path to a function block 2920 to send the standard information. If customized, the program would flow along a "Y" path to a function block 2922, wherein the response would be modified to send to the user in accordance with the preference of the profile. The program would then flow from function blocks 2920 and 2922 to a function block 2924. The program then flows to a decision block 2926 to determine if the connection has been completed, i.e., the user has logged off, and then to an End block 2928.

With respect to the overall generating of the broadcast, the advertiser can utilize this broadcast generation to actually induce the individual to undertake some type of web-based initiative, or in general, access the network for the purpose of completing an e-commerce function or the such. This is done with a tone or, alternatively, a visual encoded logo. The consumer, when viewing a broadcast or listening to some type of radio program, would be subjected to a unique audio tone, having embedded therein digital information. This unique audio tone would be heard by the user and they would automatically look to their PC to determine what type of advertisement was present on their computer. If a visual encoded logo were utilized it requires encoding the information in the logo or, alternatively, a visual unencoded logo may be utilized in connection with the audio encoded tone, which would cause the user to look to their computer. As an example, consider an advertiser that is advertising on a very expensive finals match in soccer or football. These costs can run up to many millions of dollars per minute. If an advertiser could utilize ten seconds, for example, to provide a very simple commercial with a tone embedded therein, this would automatically signal the user to turn their viewing attention to the computer and away from the remaining advertisements. This is an inducement by a tone or a visual encoded logo. This assumes that the user has their PC on and has access to the Internet. Of course, conventional television sets having Internet based services are readily available. It is anticipated that virtually all broadcast viewing apparatus in the future will have web-based services, such that they will always be interconnectable to a network.

Although the preferred embodiment has been described in detail, it should be understood that various changes, substitutions and alterations can be made therein without departing from the spirit and scope of the invention as defined by the appended claims.

What is claimed is:

1. A method for advertising over a network and broadcast media combination, comprising the steps of:

receiving at a user's computer at a location on the network an audio signal from a broadcast generated by an advertiser over a broadcast network, such that both the broadcast and the advertiser are linked, which audio signal has embedded therein unique coded information, not comprising routing information over the network;

extracting a representation of the audio signal in response to the step of receiving including at least the unique coded information;

connecting, without user intervention, the user's computer to an advertiser's location in response to the step of extracting the representation of the audio signal, and the advertiser's location being correlated to the unique coded information, wherein the step of connecting includes:
- extracting the information from the unique coded information in the representation of the audio signal as a unique code,
- transmitting the extracted unique code to an intermediate location on the network,
- transmitting to the intermediate location from the user's computer a unique user ID associated with the user and which was stored at the user's computer,
- providing a database at the intermediate location having disposed thereat an associative database associating a plurality of unique codes with routing information on the network, and also for storing user profile information associated with user IDs received thereby,
- comparing the received unique code with the information stored in the database and, if a corresponding unique code is stored therein, forwarding both the user profile information associated with the received user ID and the associated routing information back to the user's computer, and
- at the user's computer, utilizing the routing information to interconnect with the advertiser's location on the network and forwarding to the advertiser's location the user profile information;
- in conjunction with the step of connecting, causing user profile information of the user to be sent from the user's computer to the advertiser's location over the network without user intervention, such that the sending of user profile information is caused by the extraction step;
- receiving the user profile information at the advertiser's location;
- generating advertising information to forward to the user based upon the user profile information being forwarded to the advertiser's location and forwarding this advertising information to the connected user; and
- wherein broadcast of the audio signal causes both a connection to the advertiser's location on the network and a push of user profile information thereto.

2. A method for advertising over a network and broadcast media combination, comprising the steps of:
- receiving at a user's computer at a location on the network an audio signal from a broadcast generated by an advertiser over a broadcast network, such that both the broadcast and the advertiser are linked, which audio signal has embedded therein unique coded information, not comprising routing information over the network;
- extracting a representation of the audio signal in response to the step of receiving including at least the unique coded information;
- connecting, without user intervention, the user's computer to an advertiser's location in response to the step of extracting the representation of the audio signal, and the advertiser's location being correlated to the unique coded information;
- in conjunction with the step of connecting, causing the representation of the audio signal and a unique user ID stored at the user's computer to be sent from the user's computer to the advertiser's location over the network without user intervention, such that the sending of the representation of the audio signal and the unique user ID is caused by the extraction step;
- receiving the unique user ID at the advertiser's location;
- retrieving user profile information corresponding to the unique user ID by the advertiser's location, wherein the retrieving is from a database of user profile information for a plurality of users each associated with a unique user ID;
- generating advertising information to forward to the user based upon the representation of the audio signal and the user profile information retrieved by the advertiser's location and forwarding this advertising information to the connected user; and
- wherein broadcast of the audio signal causes both a connection to the advertiser's location on the network and a push of the representation of the audio signal and the unique user ID thereto.

3. The method of claim 2 wherein the representation of the audio signal is a tone.

4. A method for advertising over a network and broadcast media combination, comprising the steps of:
- receiving at a user's computer at a location on the network an audio signal from a broadcast generated by an advertiser over a broadcast network, such that both the broadcast and the advertiser are linked, which audio signal has embedded therein unique coded information, not comprising routing information over the network;
- extracting a representation of the audio signal in response to the step of receiving including at least the unique coded information;
- connecting, without user intervention, the user's computer to an advertiser's location in response to the step of extracting the representation of the audio signal, and the advertiser's location being correlated to the unique coded information;
- in conjunction with the step of connecting, causing the representation of the audio signal and a unique user ID stored at the user's computer to be sent from the user's computer to the advertiser's location over the network without user intervention, wherein the unique user ID is associated with user profile information of the user, such user profile information not stored on the user's computer, such that the sending of the representation of the audio signal and the unique user ID is caused by the extraction step;
- receiving advertising information at the user's computer from the advertiser's location, wherein the advertising information is based upon the representation of the audio signal and the user profile information corresponding to the unique user ID; and
- wherein broadcast of the audio signal causes both a connection to the advertiser's location on the network and a push of the representation of the audio signal and the unique user ID thereto.

* * * * *